US012715108B2

(12) United States Patent
Khathami et al.

(10) Patent No.: US 12,715,108 B2
(45) Date of Patent: Aug. 25, 2026

(54) ROBOTS FOR SERVICING METAL EQUIPMENT

(71) Applicant: Saudi Arabian Oil Company, Dhahran (SA)

(72) Inventors: Tariq A. Khathami, Dammam (SA); Mazin M. Fathi, Dammam (SA); Abdullah M. Salma, Dammam (SA); Abdulrahman E. Sayed, Dammam (SA); Massad S. Alanzi, Dammam (SA); Maher Hamed Alerwi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 291 days.

(21) Appl. No.: 18/501,631

(22) Filed: Nov. 3, 2023

(65) Prior Publication Data

US 2025/0144786 A1 May 8, 2025

(51) Int. Cl.

| | |
|---|---|
| ***B25J 5/00*** | (2006.01) |
| ***B25J 19/02*** | (2006.01) |
| ***B62D 57/024*** | (2006.01) |
| ***B62D 57/04*** | (2006.01) |

(52) U.S. Cl.

CPC ............. *B25J 5/007* (2013.01); *B25J 19/026* (2013.01); *B62D 57/024* (2013.01); *B62D 57/04* (2013.01)

(58) Field of Classification Search

CPC ....... B25J 5/007; B25J 19/026; B62D 57/024; B62D 57/04

See application file for complete search history.

(56) References Cited

U.S. PATENT DOCUMENTS

| | | | | |
|---|---|---|---|---|
| 11,384,291 | B1 | 7/2022 | Fathi et al. | |
| 11,472,498 | B2 | 10/2022 | Abdellatif et al. | |
| 11,548,577 | B2 | 1/2023 | Abdellatif et al. | |
| 2013/0081653 | A1 | 4/2013 | Kountotsis et al. | |
| 2015/0148949 | A1* | 5/2015 | Chin | B25J 5/007 700/245 |
| 2020/0019167 | A1* | 1/2020 | Alshamrani | G05D 1/101 |
| 2020/0172231 | A1 | 6/2020 | Abdellatif et al. | |
| 2021/0108504 | A1* | 4/2021 | Jagannathan | E21B 47/0025 |

(Continued)

FOREIGN PATENT DOCUMENTS

| | | |
|---|---|---|
| CN | 110341908 A | 10/2019 |
| CN | 112027015 A | 12/2020 |

OTHER PUBLICATIONS

Notification of Transmittal of the International Search Report and the Written Opinion of the International Searching Authority, or the Declaration dated Feb. 13, 2025 pertaining to International application No. PCT/US2024/051898 filed Oct. 18, 2024, pp. 1-14.

(Continued)

*Primary Examiner* — Zoheb S Imtiaz
(74) *Attorney, Agent, or Firm* — Dinsmore & Shohl LLP

(57) ABSTRACT

A robot for servicing metal equipment in a hydrocarbon refinery includes a robot. The robot includes a body and a plurality of magnetic wheels operatively attached to the body. The plurality of magnetic wheels are operable to attached the robot to a metal surface of the metal equipment. The robot also includes a plurality of propellers coupled to the body of the robot.

20 Claims, 11 Drawing Sheets

(56) References Cited

U.S. PATENT DOCUMENTS

| | | | | |
|---|---|---|---|---|
| 2023/0034243 | A1 | 2/2023 | Ceborahs et al. | |
| 2024/0076071 | A1* | 3/2024 | Zarrouk ................. | B64U 10/60 |

OTHER PUBLICATIONS

Wolski, "Maxells's equations for magnets", University of Liverpool and the Cockcroft Institute, UK, 2011.
Yadav, "Effect of Temperature on Electric Current, Magnets and Electromagnet", International Journal of Advancements in Technology, vol. 7, No. 4, 2016.

* cited by examiner 200
203
A
202
116
118
104
104
106
112
112
106
104
104
122
106
106
112
112
104
104
100
102

ROBOTS FOR SERVICING METAL EQUIPMENT

BACKGROUND

Field

The present disclosure relates to robots for servicing metal equipment, more specifically, to the detection, removal, or both of solid deposits from inside a hollow structure through the use of robots.

Technical Background

Solid deposits may accumulate on the inner surface of vessels or lines of chemical processing systems such as located in hydrocarbon refineries, petrochemical industries, power plants, or desalination plants. Moreover, accumulation of the solid deposits may result in an increase in pressure drop and a decrease in heat transfer, decreasing the efficiency of the system. The solid deposits may be removed through pressurized water or other mechanical tools. The solid deposits may also be removed through the use of chemical solutions. However, typical methods using mechanical tools to remove the accumulation of solid deposits on the inner surface of vessels and lines require a full shut down and isolation of the processing system, which is time consuming and costly. Typical methods using chemical solutions require very high temperatures and do not result in the removal of all solid deposits. Moreover, chemical processing systems may include vessels or lines that span or hang hundreds of feet in the air, making human inspection or cleaning difficult or impossible.

SUMMARY

Accordingly, there is an ongoing need for robots for servicing metal equipment and, specifically, for robots and robot systems for assisting in the detection and removal of solid deposits from interior surfaces of chemical processing units and equipment. Additionally, an ongoing need exists for systems and methods for automatically determining a location of accumulation of solid deposits and operating the system through use of drones removably attached to the robots.

According to embodiments of the present disclosure, a robot for servicing metal equipment in a hydrocarbon refinery may include a body and a plurality of magnetic wheels operatively attached to the body, where the plurality of magnetic wheels may be operable to attach the robot to a metal surface of the metal equipment. The robot may also include a plurality of propellers coupled to the body.

A system for traversing a metal surface of metal equipment may include a hollow structure including an internal volume and an interior surface, a plurality of robots configured to traverse the metal surface of the metal equipment, a metallic object that may be disposed within the hollow structure, and one or more inspection sensors that may be operable to produce a signal indicative of one or more conditions of the metal equipment. The system may also include at least one location sensor coupled to each of the plurality of robots and a control system communicatively coupled to the plurality of robots, where the control system may include a processor, at least one memory module communicatively coupled to the processor, and machine readable and executable instructions stored on the at least one memory module. The machine readable and executable instructions, when executed by the processor, may cause the system to automatically activate a plurality of propellers for at least one of the plurality of robots, position the plurality of robots on the metal surface, and activate the one or more inspection sensors.

A process for traversing a metal surface may include activating a plurality of propellers for at least one of a plurality of robots. At least one location sensor may be coupled to each of the plurality of robots. The process may further include positioning the plurality of robots on the metal surface.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, in which like structure may be indicated with like reference numerals and in which.

DETAILED DESCRIPTION

Figure 1:
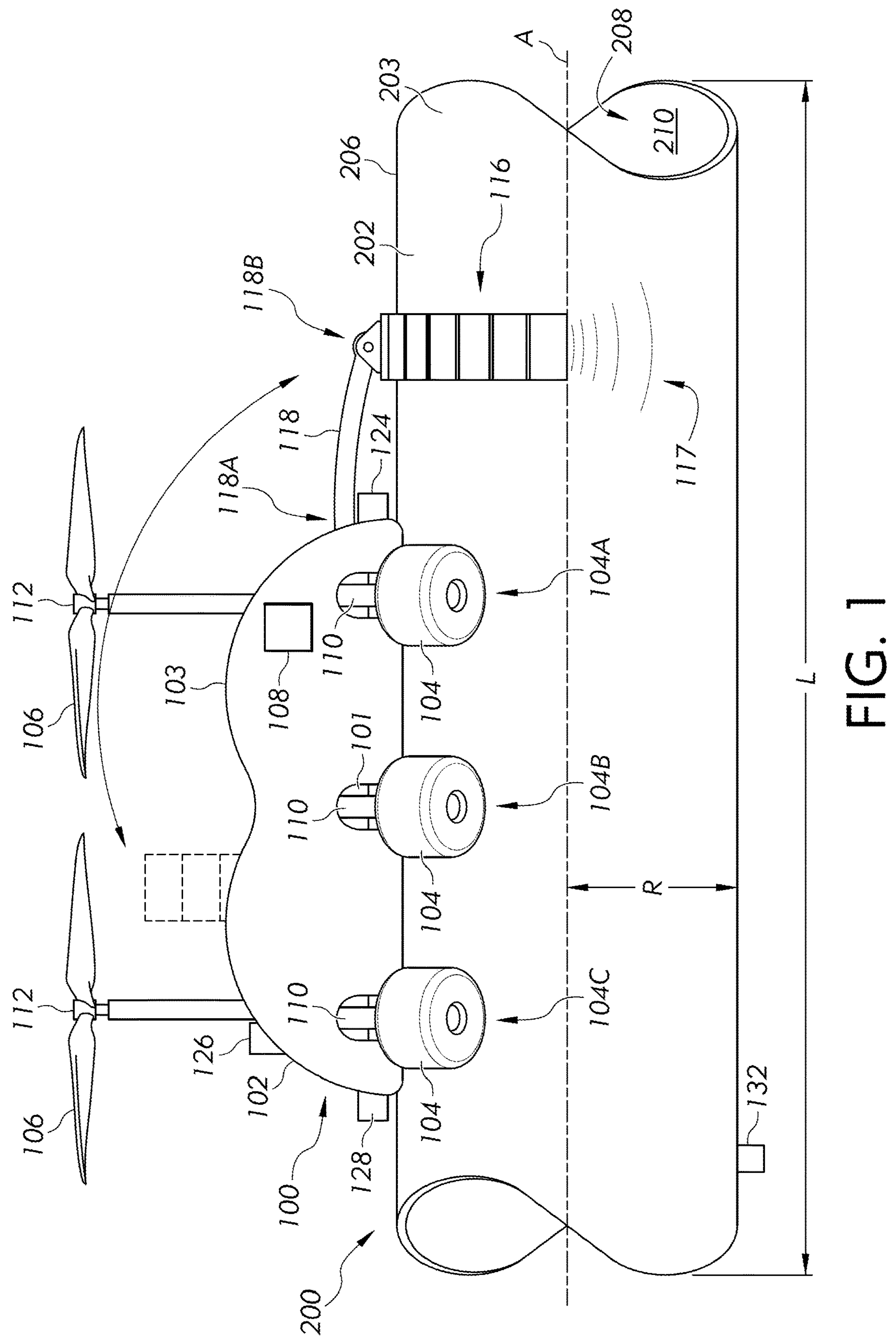
FIG. 1 schematically depicts a side view of a robot for servicing metal equipment, according to embodiments shown and described in the present disclosure.

Embodiments of the present disclosure are described in the detailed description, which follows. The present disclosure is directed to robots for servicing metal equipment. In particular, the present disclosure is directed to systems and processes utilizing robots for servicing metal equipment in a hydrocarbon refinery. Referring now to FIG. 1, one embodiment of a robot 100 of the present disclosure for servicing metal equipment 200 in a hydrocarbon refinery may include a body 102 and a plurality of magnetic wheels 104 operatively attached to the body 102. The plurality of magnetic wheels 104 may be operable to attach the robot 100 to a metal surface 202 of the metal equipment 200. The robot 100 may also include a plurality of propellers 106 coupled to the body 100.

As used throughout the present disclosure, the term "axial" refers to a cylindrical coordinate direction that is substantially parallel to the central axis A of a hollow structure or of metal equipment.

As used throughout the present disclosure, the term "angular" refers to a cylindrical coordinate direction that is around a circumference of the hollow structure, such as around an outer perimeter OP of the hollow structure.

As used throughout the present disclosure, the term "radial" refers to a cylindrical coordinate direction that is perpendicular to and outward from the central axis A of the hollow structure.

As used throughout the present disclosure, "solid deposits" refer to salts, coke, asphaltenes, carbon, or any other byproduct of a hydrocarbon chemical reaction or hydrocarbon processing that may be disposed on an inner surface of the hollow structure.

As used throughout the present disclosure, the terms "upstream" and "downstream" refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

Systems for chemical processing, such as but not limited to petrochemical reactors, heaters, heat exchangers, transfer piping, catalyst regenerators, separation units, or other chemical processing units may include hollow structures, such as but not limited to pipes, tanks, pressure vessels, or other hollow structures, that have internal surfaces that contact process fluids during chemical processing. During operation of the systems for chemical processing, the hollow structures of the system can accumulate solid deposits on the inner walls of hollow structures. Such solid deposits may include but are not limited to coke, salts, asphaltenes, or combinations of these. Accumulation of the solid deposits on the inner walls may lead to increased pressure drop, decreased heat transfer, restricted flow, or combinations of these conditions, which may decrease the efficiency of the system and lead to poor product quality.

Systems and methods have been developed to monitor the accumulation of and removal of the solid deposits in such systems for chemical processes. These conventional methods of removing solid deposits involve the use of mechanical tools or chemical solutions to monitor the accumulation of and remove the solid deposits. However, conventional mechanical tools require full shut down and isolation of the targeted system, and utilization of chemical solutions requires very high temperatures and does not remove solid deposits with stronger bonds, such as hard coke, that require more dissociation energy to break. Use of mechanical tools often require the use of human intervention, making removal of solid deposits difficult. Use of chemical solutions can also result in the corrosion of the hollow structure as well as other equipment and piping systems.

The present disclosure solves these problems by providing robots for servicing metal equipment that enable monitoring and removal of solid deposits from the interior surfaces of the metal equipment using robots. Referring again to FIG. 1, the robot 100 for servicing metal equipment 200 in a hydrocarbon refinery may include the body 102, the plurality of magnetic wheels 104 operatively attached to the body 102, and the plurality of propellers 106 coupled to the body 102.

In embodiments, the body 102 may include a chassis 101 and an outer cover 103 coupled to the chassis, and the plurality of magnetic wheels 104 may be operatively coupled to the chassis 101. The plurality of magnetic wheels 104 may be operable to attach the robot 100 to a metal surface 202 of the metal equipment 200. The metal equipment 200 may include at least one side wall 206 with an interior surface 208 defining an internal volume 210 of the metal equipment 200 and the metal surface 202 may be an external surface of the at least one side wall 206, as depicted in the cross-section of the metal equipment 200 of FIG. 5. The metal equipment 200 may have the center axis A, the axial length L measured parallel to the center axis A, and the outer perimeter OP, where the outer perimeter OP is a shape of the metal surface 202 of the at least one side wall 206 of the metal equipment 200 in the plane perpendicular to the center axis A.

The robots, systems, and methods may include moving the robot 100 to various positions on the metal surface 202 to scan the interior surface 208 and attract a metallic object 114 to various points on the interior surface 208 to loosen solid deposits 201 on the interior surface 208 (as discussed further below). Robots, systems, and methods of the present disclosure may include moving the robots 100 on the metal surface 202 through the magnetic wheels 104. Additionally or alternatively, in embodiments, the robots 100, systems, and methods of the present disclosure may include moving the robots 100 using the propellers 106 or through the use of a drone 400 (see FIG. 4). Using the robots 100 to service the metal equipment 200 may reduce or eliminate the need for human involvement when cleaning and/or inspecting the interior surface 208 of the metal equipment 200. Additionally or alternatively, the robots 100 and methods of using the robots 100 to service the metal equipment 200 may enable servicing equipment that would otherwise be inaccessible without construction of additional access means or deconstruction of the metal equipment 200. Moreover, the systems and methods of the present disclosure may eliminate the need to shut down the system to remove solid deposits 201 from the interior surface 208. This may result in increased efficiency by removing the solid deposits 201 while the system is running and maintaining the equipment at operating temperature and pressure, which eliminates the need for heating up and cooling down equipment for removing the solid deposits through conventional mechanical tools.

The systems and methods of the present disclosure may also allow for offline removal of solid deposits.

Figure 2:
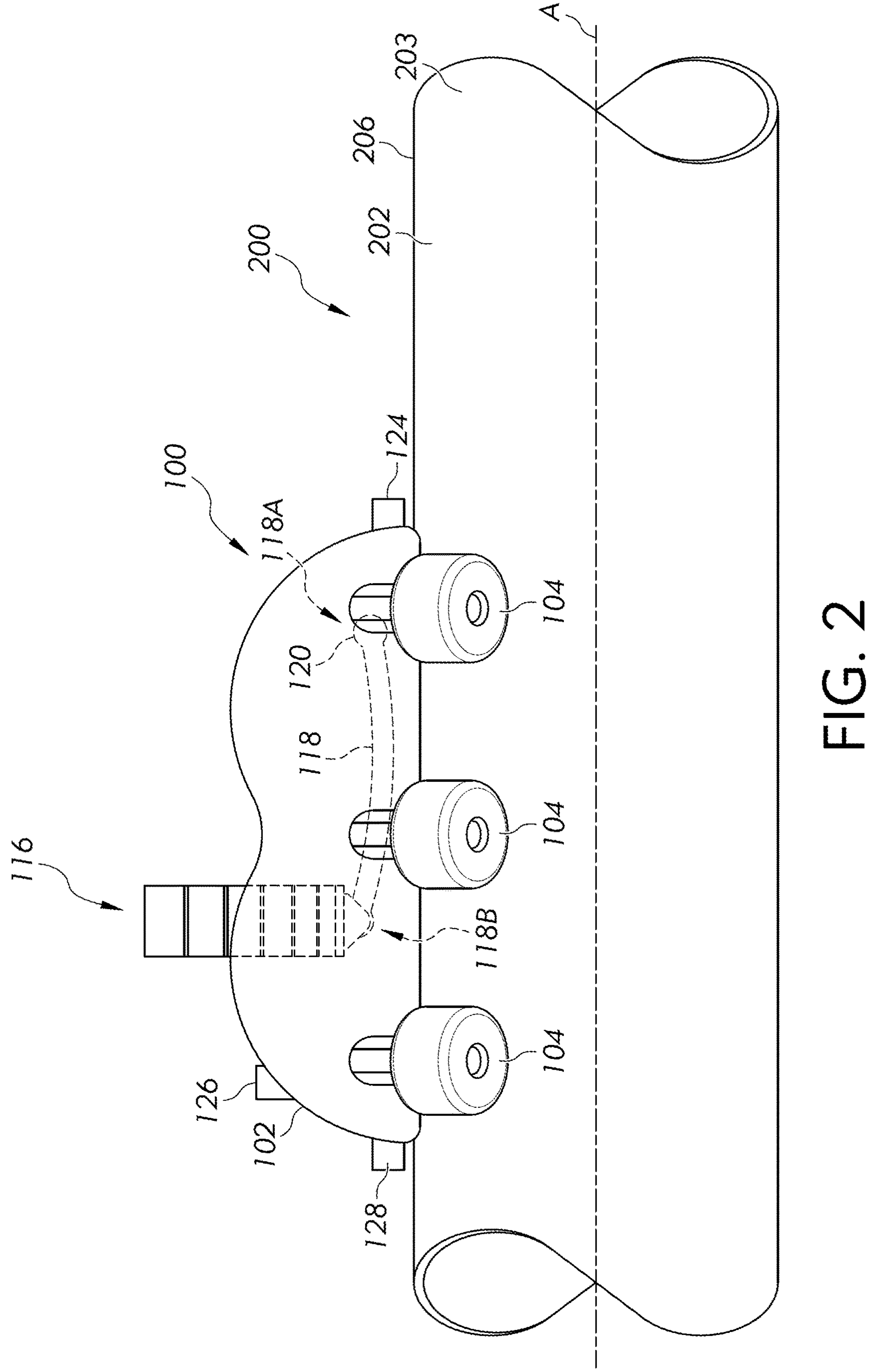
FIG. 2 schematically depicts a side view of the robot for servicing metal equipment of FIG. 1 with an arm in a retracted position, according to embodiments shown and described in the present disclosure.
Figure 3:
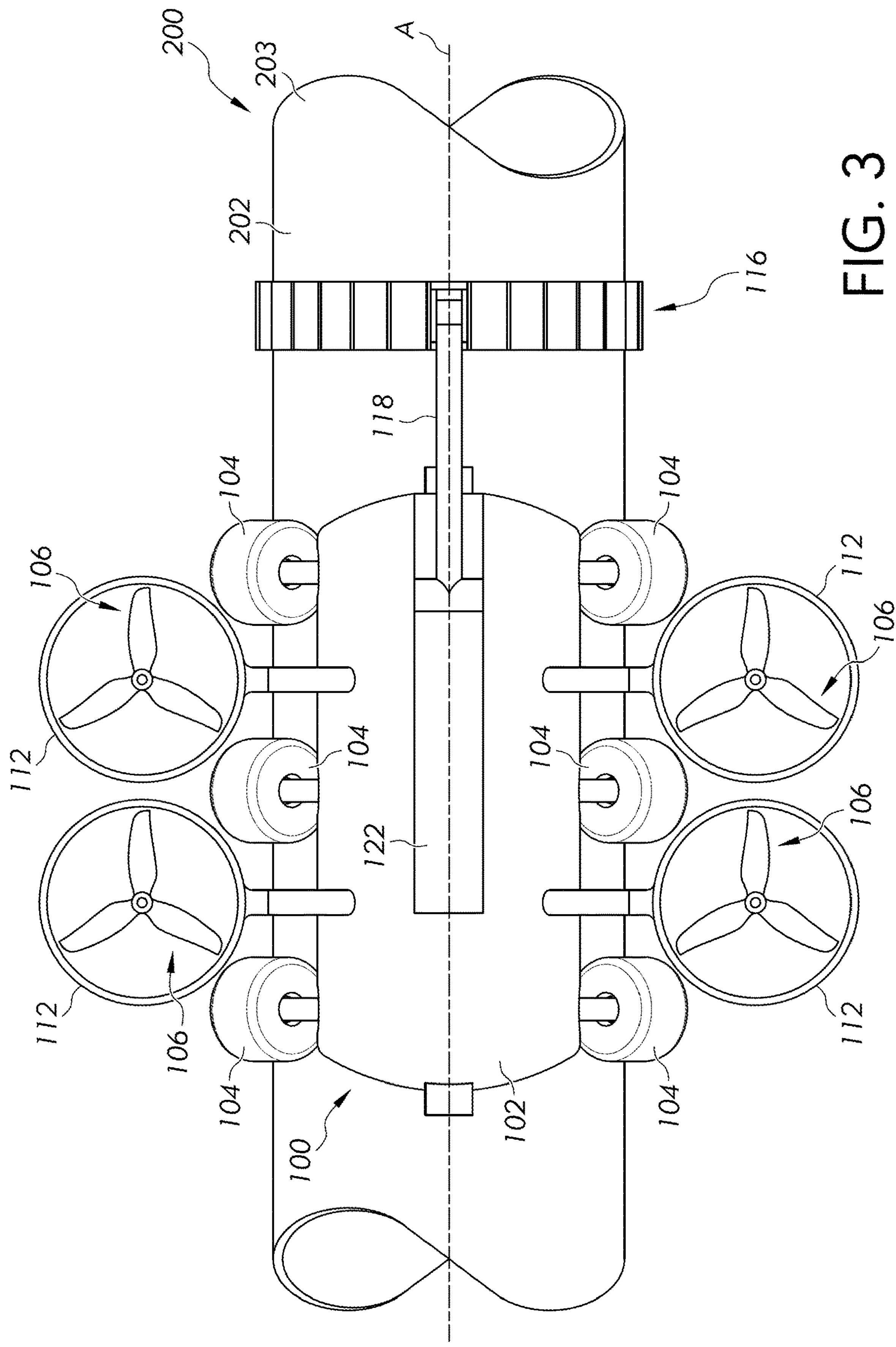
FIG. 3 schematically depicts a top view of another embodiment of a robot for servicing metal equipment, according to embodiments shown and described in the present disclosure.
Figure 5:
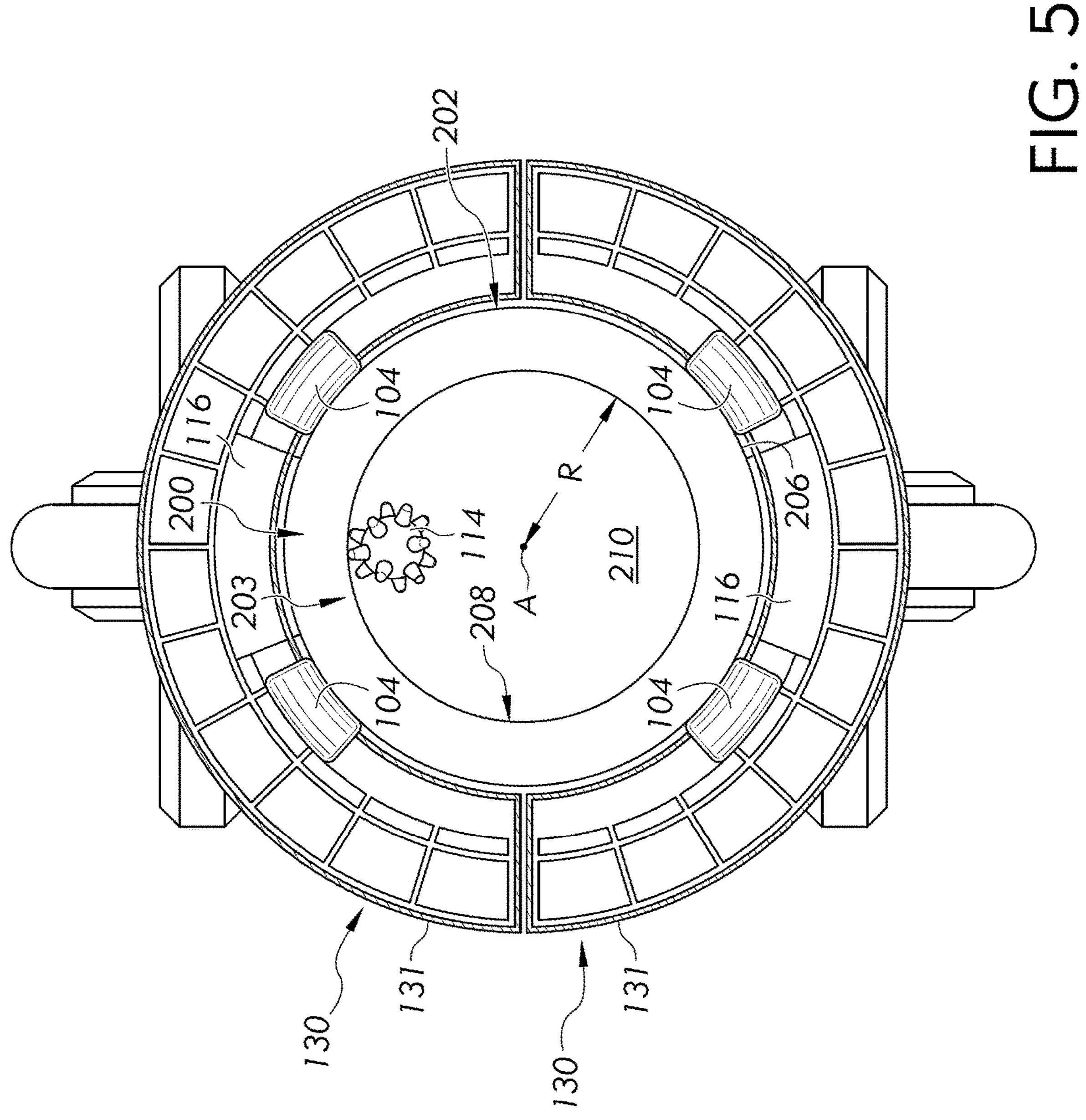
FIG. 5 schematically depicts a top cross-section of robots and a spherical metallic object for servicing metal equipment in a hydrocarbon refinery, according to embodiments shown and described in the present disclosure.

Referring to FIGS. 1-3, in embodiments, the robot 100 may include a plurality of sets of magnetic wheels 104, such as a first set 104A, a second set 104B, and a third set 104C of the plurality of magnetic wheels 104 attached to the metal surface 202. Although shown with three sets of magnetic wheels 104 in FIGS. 1-3, it should be understood that the robot 100 may have any number of sets of the plurality of magnetic wheels 104 attached to the body 102 of the robot 100, such as 1, 2, 3, 4, 5, 6, or more than 6 sets of magnetic wheels 104. Also of note is that only one side of the robot 100 is visible in FIG. 1 and FIG. 2. The top view of FIG. 3 and the cross-section of FIG. 5 depicts the other side of each set of the plurality of magnetic wheels 104.

The plurality of magnetic wheels 104 may be of any shape to attach the robot 100 to the metal surface 202. In embodiments, the magnetic wheels 104 do not rotate and simply attach the robot 100 to the metal surface 202. In embodiments, the magnetic wheels 104 may be rotatable relative to the body 102 of the robot 100. The magnetic wheels 104 may be freely rotatable relative to the robot 100, such that activation of the propellers 106 may traverse the robot 100 along the metal surface 202. In embodiments, the magnetic wheels 104 may be coupled to a wheel drive 110 operable to rotate each of the plurality of magnetic wheels 104 relative to the chassis 101. When driven, the magnetic wheels 104 may be operated to move the robot 100 along the metal surface 202 of the metal equipment 200 alone or in combination with the propellers 106.

In embodiments, the magnetic wheels 104 may each comprise permanent magnets. The permanent magnets may be used if low temperature chemical processing (such as less than 100° C.) are taking place within the metal equipment 200. The magnetic wheels 104 may also comprise electromagnets. An electric current may be provided to the electromagnets to activate the electromagnets. Electric current provided to the electromagnets activates the electromagnets and induces an electromagnetic field in the magnetic wheels 104. The electromagnetic field may produce an electromagnetic force that is sufficient to cause the robot 100 to attach to the metal surface 202. When the electric current is no longer supplied to the magnetic wheels 104, the magnetic wheels 104 may be deactivated and, thus, the robot 100 may no longer be magnetically attached to the metal surface 202.

In embodiments, the magnetic wheels 104 may be electromagnets and may have an adjustable electromagnetic force that the magnetic wheels 104 produce. In embodiments, the intensity of the electromagnetic force the magnetic wheels 104 produced may be based on the amount of electric current running through the electromagnets. The intensity of the electromagnetic force required in the electromagnets may depend on a weight of the robot 100, whether the metal equipment 200 is located outdoors, and/or a number of the magnetic wheels 104. For example, metal equipment 200 outdoors may experience wind, rain or other inclement weather. As such, a stronger electromagnetic force in the electromagnets may be required if a heavy robot 100 with 4 wheels is to be attached to metal equipment 200 that is outdoors when compared to the electromagnetic force required if a lighter robot 100 with 10 wheels is to be attached to metal equipment 200 that is indoors. In embodiments, the propellers 106 may be adjusted and operated to provide additional force to maintain the robot 100 in contact with the metal surface 202 of the metal equipment 200.

Referring again to FIG. 1, in embodiments in which the magnetic wheels 104 include electromagnets, the robot 100 may further include an electrical power source 108 electrically coupled to each of the magnetic wheels 104. The electrical power source 108 may provide the current to the magnetic wheels 104 to activate the electromagnets. The electrical power source 108 may include a rechargeable battery, disposable batteries, or any other suitable power source. The electrical power source 108 may be charged through the use of a recharging station (such as recharging station 902 discussed in relation to FIG. 9). The electrical power source 108 may also power other components of the robot 100 such as the propellers 106, the wheel drive 110, arm actuator 120, or combinations of these.

In embodiments, the robot 100 may further include the wheel drive 110 operatively coupled to the body 102 of the robot 100. The wheel drive 110 may extend substantially perpendicular to a side, front, and/or back of the robot 100. The wheel drive 110 may be operable to rotate each of the magnetic wheels 104 relative to the body 102 to move the robot 100 relative to the metal surface 202 of the metal equipment 200. The wheel drive 110 may cause the robot 100 to move in a forward or backward direction. The robot 100 may comprise one, two, three, four, or more than 4 wheel drives 110. The wheel drive 110 may attach to all of the magnetic wheels 104 or only some of the magnetic wheels 104. The wheel drive 110 may be operable to rotate the magnetic wheels 104 at varying speeds and, thus, cause the robot 100 to traverse the metal surface 202 at various speeds. The magnetic wheels 104 may cause the robot 100 to travel in a straight line, or the magnetic wheels 104 may turn the robot 100 in different directions, such as by rotating certain magnetic wheels 104 and leaving others stationary, or by rotating different magnetic wheels 104 at different rotational speeds.

In embodiments, the magnetic wheels 104 may be operable to pivot relative to the body 102 to move the robot 100 vertically, horizontally, or both with respect to the metal surface 202. The first set 104A of magnetic wheels 104 may be operable to pivot, while the second set 104B and the third set 104C of the magnetic wheels 104 may not pivot. As such, pivoting of the first set 104A of magnetic wheels 104 may turn the robot 100 to move in a particular direction. In embodiments, the second set 104B and the third set 104C may also be operable to pivot, such that the robot 100 may travel in a diagonal direction when all sets of magnetic wheels 104 are pivoted in a direction. Power from the wheel drive 110 may be strong enough to move the robot 100. However, in embodiments, the propellers 106 may operate in conjunction with the magnetic wheels 104 assist in moving the robot 100.

Referring again to FIGS. 1-3, the plurality of propellers 106 may be operable to reposition the robot 100 on the metal surface 202 of the metal equipment 200. The propellers 106 may provide propulsion to the robot 100 to assist the wheel drive 110 in traversing the robot 100 along the metal surface 202. The propellers 106 may provide enough propulsion to the robot 100 to traverse the robot along the metal surface 202, such that the wheel drive 110 is unnecessary. In such embodiments, the propellers 106 may rotate to provide propulsion to the robot 100 and the magnetic wheels 104 may pivot to change direction of the robot 100, as explained above. The propellers 106 may be electrically coupled to the electrical power source 108.

In embodiments, the robot 100 may weigh 1 kg, 2 kg, 4 kg, 10 kg, 25, kg, 50 kg, or more depending on dimensions of the robot 100 and/or attachments on the robot 100. The robot 100 may transfer a force onto the metal equipment 200 when the robot 100 is attached to the metal equipment 200, such that the force transferred to the metal equipment 200 may equal the weight of the robot 100. In embodiments, the force the robot 100 transfers to the metal equipment 200 may be greater than a force limit of the metal equipment 200. For example, the metal equipment 200 may be capable of withstanding forces of up to 10 kg without deforming. If the weight of the robot 100 is over 10 kg, the weight of the robot 100 would result in damage to the metal equipment 200 when the robot is attached to the metal surface 202 of the metal equipment 200.

As such, the plurality of propellers 106 may also be operable to generate a lifting force to counteract a weight of the robot 100. The plurality of propellers 106 may be operable to generate a lifting force to counteract 10%, 20%, 40%, 60%, 80% or 100% of the weight of the robot 100. As such, the lifting force of the propellers 106 will allow the robot 100 that weighs more than the force limit of the metal equipment 200 to still be attached to the metal equipment 200.

The robot 100 may also change direction due to the propellers 106 changing orientation. As such, each of the propellers 106 may be attached to and rotatable relative to the body 102 of the robot 100. In embodiments, one or each of the propellers 106 may include a propeller positioner 112 operable to change an orientation of the propellers 106. The propeller positioner 112 may be operable to rotate one or all of the propellers 106 through 360 degrees relative to the body 102 of the robot 100, such that the propellers 106 may provide propulsion to the robot 100 in any direction. As noted hereinabove, the propellers 106 may be operated to apply a force that causes the magnetic wheels 104 to rotate, traversing the robot 100 along the metal surface 202. The propellers 106 may also lift the robot 100 off of the metal surface 202.

As depicted in FIG. 3, the propellers 106 may rotate relative to the body 102 such that the propulsion of the propellers 106 is facing substantially perpendicular to the axial direction (i.e., toward the magnetic wheels 104). The propellers 106 may provide enough propulsion to detach the magnetic wheels 104 from the metal surface 202 when the magnetic wheels 104 are permanent magnets or when the magnetic wheels 104 are electromagnets that are turned on. The propellers 106 may only provide enough propulsion to lift the robot 100 off of the metal surface 202 when the electromagnets have been turned off (i.e., when current is no longer running to the electromagnets).

The propellers 106 may lift the robot 100 off of the metal surface 202 and then move the robot 100 to another position on the metal surface 202. The robot 100 may become reattached to the metal surface 202 when the propellers 106 bring the robot 100 close enough to the metal surface 202 such that the magnetic wheels 104 attract the robot 100 to the metal surface 202. When the magnetic wheels 104 are electromagnets, the robot 100 may not be reattached to the metal surface 202 until the electromagnets have been turned back on.

Figure 4:
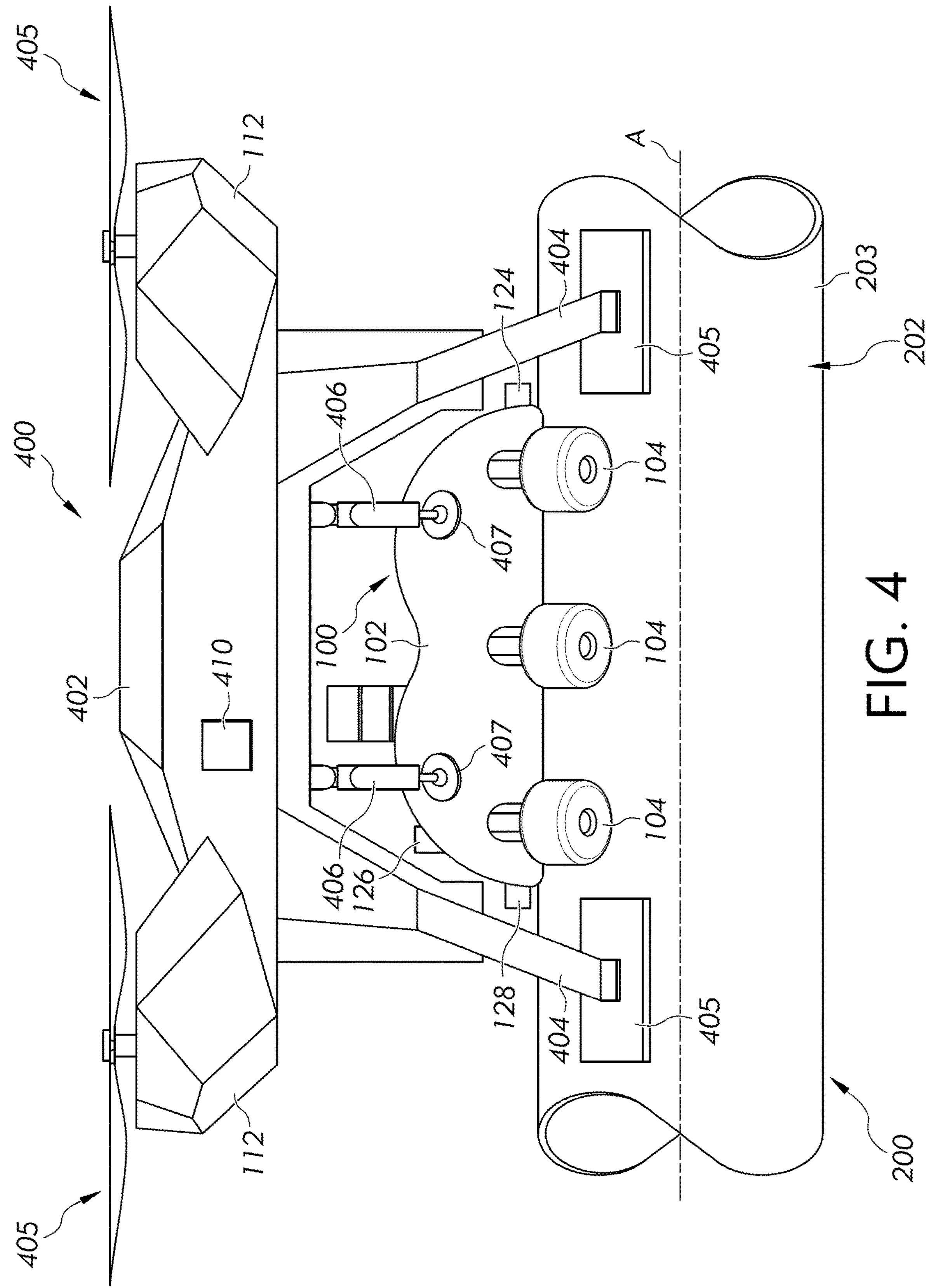
FIG. 4 schematically depicts a side view of the robot for servicing metal equipment of FIG. 1 and a drone docket with the robot, according to embodiments shown and described in the present disclosure.

Referring now to FIG. 4, in embodiments, the robot 100 may also include the drone 400 with a drone body 402, as depicted in FIG. 4. The drone 400 may be operable to move the robot 100 to different locations along the metal surface 202. The drone 400 may include the propellers 106 coupled to the drone body 402, such as drone propellers 405, such that the drone propellers 405 may provide propulsion to the drone 400, allowing the drone 400 to fly. As with the propellers 106 attached to the body 102 of the robot 100, the drone propellers 405 attached to the drone body 402 of the drone 400 may include propeller positioners 112 operable to change the orientation of the propellers 106 360 degrees relative to the drone body 402.

The drone body 402 may include drone extensions 404. The drone extensions 404 may be operable to perch the drone 400 onto the metal surface 202. The drone extensions 404 may rest on the metal surface 202 such that the drone propellers 405 of the drone 400 may turn off and the drone 400 may be perched on the metal surface 202. In embodiments, the drone extensions 404 may include drone extension magnets 405 to attach the drone extensions 404 to the metal surface 202. The drone extension magnets 405 may include permanent magnets or electromagnets.

The drone body 402 of the drone 400 may be releasable from the body 102 of the robot 100. The drone body 402 may be releasably coupled to the drone body 402 through drone attachments 406 extending from the drone body 402. The drone attachments 406 may be disposed on an underside of the drone body 402, such that the drone 400 may be perched over the robot 100 and connect to the robot 100 through the drone attachments 406. The drone attachments 406 may include drone attachment magnets 407 that attach to the body 102 of the robot 100. The attachment magnets 407 may include permanent magnets or electromagnets. The drone attachments 406 may attach the drone 400 to the body 102 of the robot 100 in a variety of manners, such as but not limited to hook connections, clips, suction cup connections, threaded connections, or any other suitable connection type.

In embodiments, the drone extensions 404 and the drone attachments 406 may be retractable from the drone body 402. The drone extensions 404 and the drone attachments 406 may be retracted into the drone body 402 when not in use, such as when the drone 400 is flying to another location of the metal surface 202 when it is not carrying the robot 100. When the drone 400 reaches a location on the metal surface 202 where the robot 100 is located, the drone extensions 404 and/or the drone attachments 406 may extend from the drone body 402 to perch the drone on the metal surface 202 and attach to the body 102 of the robot 100.

The drone may include a drone power source 410 electrically coupled to the drone propellers 405, the drone extensions 404, the drone extension magnets 405, the drone attachments 406, and/or the drone attachment magnets 407. The drone power source 410 may include a rechargeable battery, disposable batteries, or any other suitable power source.

Referring again to FIG. 1, the robot 100 may further include a magnet 116 coupled to the body 102. The magnet 116 may be operable to attract the metallic object 114 to a first position 251 on the metal surface 202 (as explained further below). The magnet 116 may extend around at least a portion of the metal surface 202, as depicted in FIG. 1.

As discussed further in relation to FIG. 5, the magnet 116 may guide movement of the metallic object 114 within the metal equipment 200. The magnet 116 may be an electromagnet, permanent magnet, or any other suitable magnet type. A permanent magnet may be used as the magnet 116 if low temperature chemical processing (such as less than 100° C.) are taking place within the metal equipment 200. If the magnet 116 is an electromagnet, an electric current may be provided to the electromagnet. Electric current provided to the electromagnet activates the electromagnet and induces a magnetic field 117 around the magnet. When the electric current is no longer supplied to the magnet 116, the magnet 116 may be deactivated. The electric current supplied to the magnet 116 may be separate from the electric current supplied to the magnetic wheels 104, such that the magnetic wheels 104 may be activated while the magnet 116 is deactivated, or the magnetic wheels 104 are deactivated while the magnet 116 is activated.

The magnet 116 may be connected to the body 102 in a variety of manners. In embodiments, the magnet 116 may be connected to the body 102 through a retractable arm 118. The retractable arm 118 may have a proximal end 118A and a distal end 118B. The proximal end 118A may be coupled to the body 102, such as being attached to the body 102 at a pivot point so that the arm 118 can be rotated about the pivot point relative to the body 102. The distal end 118B may be coupled to the magnet 116, such as being rigidly attached to the magnet 116. The retractable arm 118 may be straight, curved, or any other suitable shape with respect to a shape of the retractable arm 118 between the proximal end 118A and the distal end 118B.

The robot 100 may further include an arm actuator 120, as depicted in FIG. 2. The arm actuator 120 may be operatively coupled to the retractable arm 118, such that the arm actuator 120 may be operable to lower and raise the retractable arm 118 relative to the body 102 to engage or disengage the magnet 116 from the metal surface 202 of the metal equipment 200. The arm actuator 120 may be an electrical rotatory actuator, a pneumatic rotary actuator, any other suitable actuator or motor.

FIG. 1 depicts the retractable arm 118 in an engaged position. In the engaged position, the magnet 116 is engaged with the metal surface 202. In contrast, FIG. 2 depicts the retractable arm 118 in a retracted position. In the retracted position, the magnet 116 is disengaged with the metal surface 202. When in the retracted position, the retractable arm 118 may cause the magnet 116 to raise from the metal surface 202 by any distance. In embodiments, when the retractable arm 118 is in the retracted position, the retractable arm 118 may be partially or entirely disposed within a cavity 122 within the body 102, as depicted in FIG. 2. The cavity 122 allows the retractable arm 118 to be stored within the body 102, such as when the drone 400 is attaching to the robot 100 to move the robot 100, as depicted in FIG. 4 and as discussed further above. The cavity 122 may also be large enough to partially or entirely store the magnet 116. The cavity 122 may also house the arm actuator 120.

In embodiments, the robot 100 may include a single magnet 116 attached to the distal end 118B of the retractable arm 118. In embodiments, the robot may 100 include a plurality of magnets 116 attached to the distal end 118B of the retractable arm 118, as depicted in FIG. 1. Each of the magnets 116 may be independently activated, such as to attract the metallic object 114 to a point on the interior surface 208 of the metal equipment 200 corresponding to a position of the magnet 116 on the metal surface 202.

Referring now to FIG. 5, in embodiments, the robot 100 may include a hollow magnet housing 130 with an inside surface 131 and the magnet 116 may be disposed within the hollow magnet housing 130. The hollow magnet housing 130 may extend around at least a portion of the metal surface 202. The magnet 116 may be disposed within the hollow magnet housing 130, such that the magnet 116 is slidable within the hollow magnet housing 130. The hollow magnet housing 130 may extend 20 degrees, 30 degrees, 60 degrees, 120 degrees, 180 degrees, or even more around the outer perimeter OP of the metal equipment 200, such that the magnet 116 may slide along the outer perimeter OP of the metal equipment 200.

Still referring to FIG. 5, in embodiments, a system for servicing metal equipment may include a plurality of robots 100 to which a plurality of magnets 116 are coupled. The plurality of robots 100 may be positioned at various locations on the metal surface 202 of the metal equipment 200. The robots 100 may utilize the magnets 116 to attract the metallic object 114 to the interior surface 208 of the metal equipment to reduce the solid deposit 201 buildup on the interior surface 208. The robots 100 may do so through activation and deactivation of the magnets 116.

The metallic object 114 may be positioned within the internal volume 210 of the metal equipment 200. The metallic object 114 may be decoupled from the interior surface 208 of the metal equipment 200 so that the metallic object 114 is free to move within the internal volume 210 relative to the metal equipment 200. The magnet 116 may produce an electromagnetic force that is sufficient to cause the metallic object 114 within the metal equipment 200 to travel through the internal volume 210 of the metal equipment 200 to impact the interior surface 208 of the metal equipment 200 proximate to the magnet 116. In embodiments, the magnet 116 may be an electromagnet and may have an adjustable electromagnetic force that the magnet 116 produces. In embodiments, the intensity of the electromagnetic force the magnet 116 produces may be based on the amount of electric current running through the electromagnet. The intensity of the electromagnetic force required by the magnet 116 may depend on a distance between the two magnets 116, which may depend on the inner radius R of the metal equipment 200 or a location of each of the robots 100. For metal equipment 200 having a larger inner radius R or robots 100 being positioned farther apart on the metal surface 202, the magnets 116 may be operated to produce greater electromagnetic force compared to a the force exerted by the magnets 116 for metal equipment 200 having a smaller inner radius R or robots 100 being positioned closer to one another on the metal surface 202.

The intensity of electromagnetic force required by the magnets 116 may also be adjusted based on resistance applied to the metallic object 114 within the metal equipment 200. The resistance applied to the metallic object 114 within the metal equipment 200 may depend on the temperature of the chemical processing taking place, the flow rate of solvent 215 (discussed in FIG. 6) flowing through the metal equipment 200, the type of solvent 215 flowing through the metal equipment 200, or any other factor that might affect the amount of resistance applied to the metallic object 114 when the metallic object 114 moves across the internal volume 210 from a location of a first magnet 116A to a location of a second magnet 116B (generally corresponding to a location of a first robot 100A to a location of a second robot 100B, as explained further below in discussion of FIGS. 8 and 9). The metallic object 114 may be inserted into the metal equipment through the use of an injection system 600 (see FIGS. 6A and 6B).

Figure 6A:
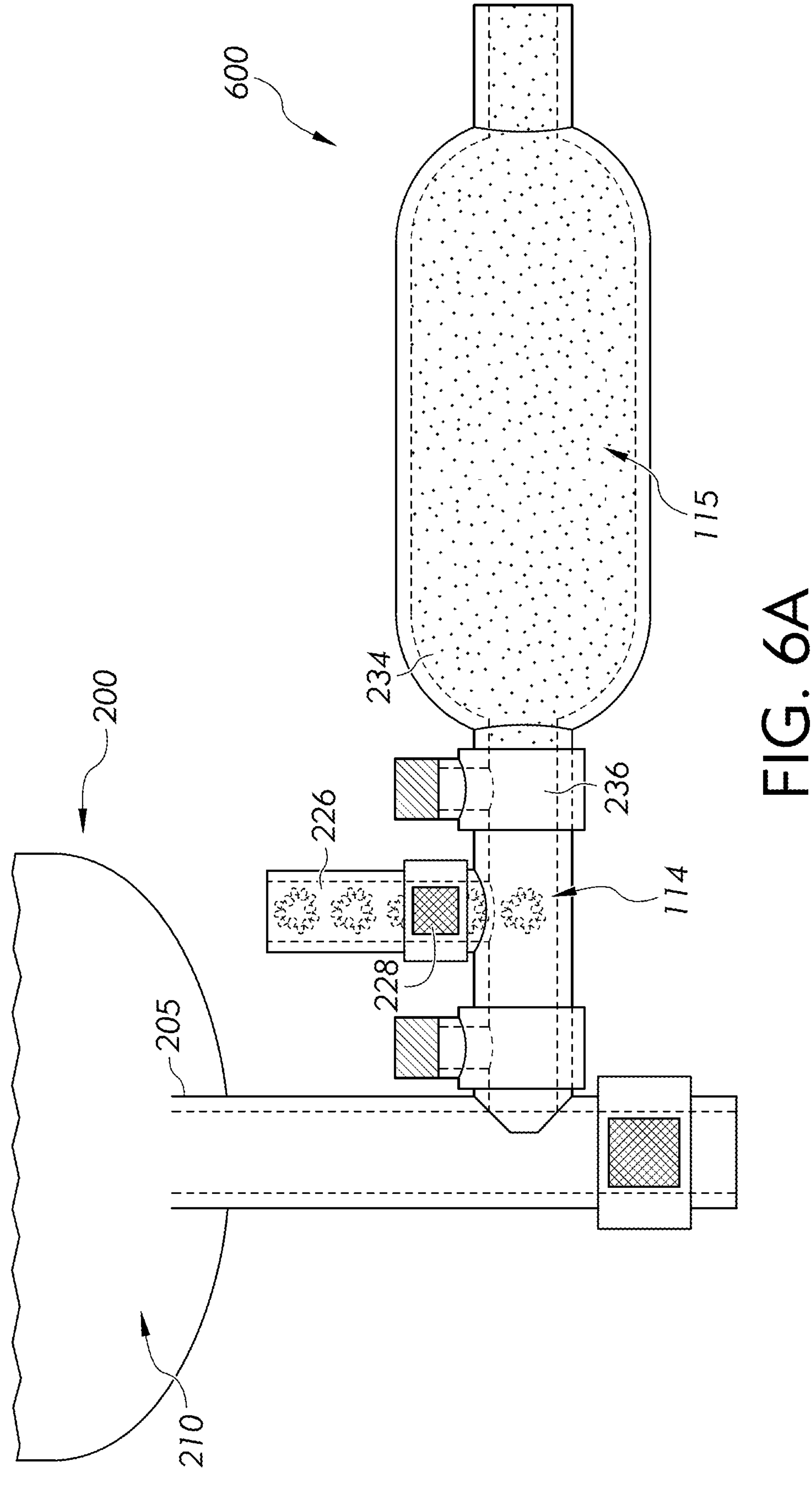
FIG. 6A schematically depicts an injection system for introducing the metallic object to an internal volume of metal equipment, according to embodiments shown and described in the present disclosure.
Figure 6B:
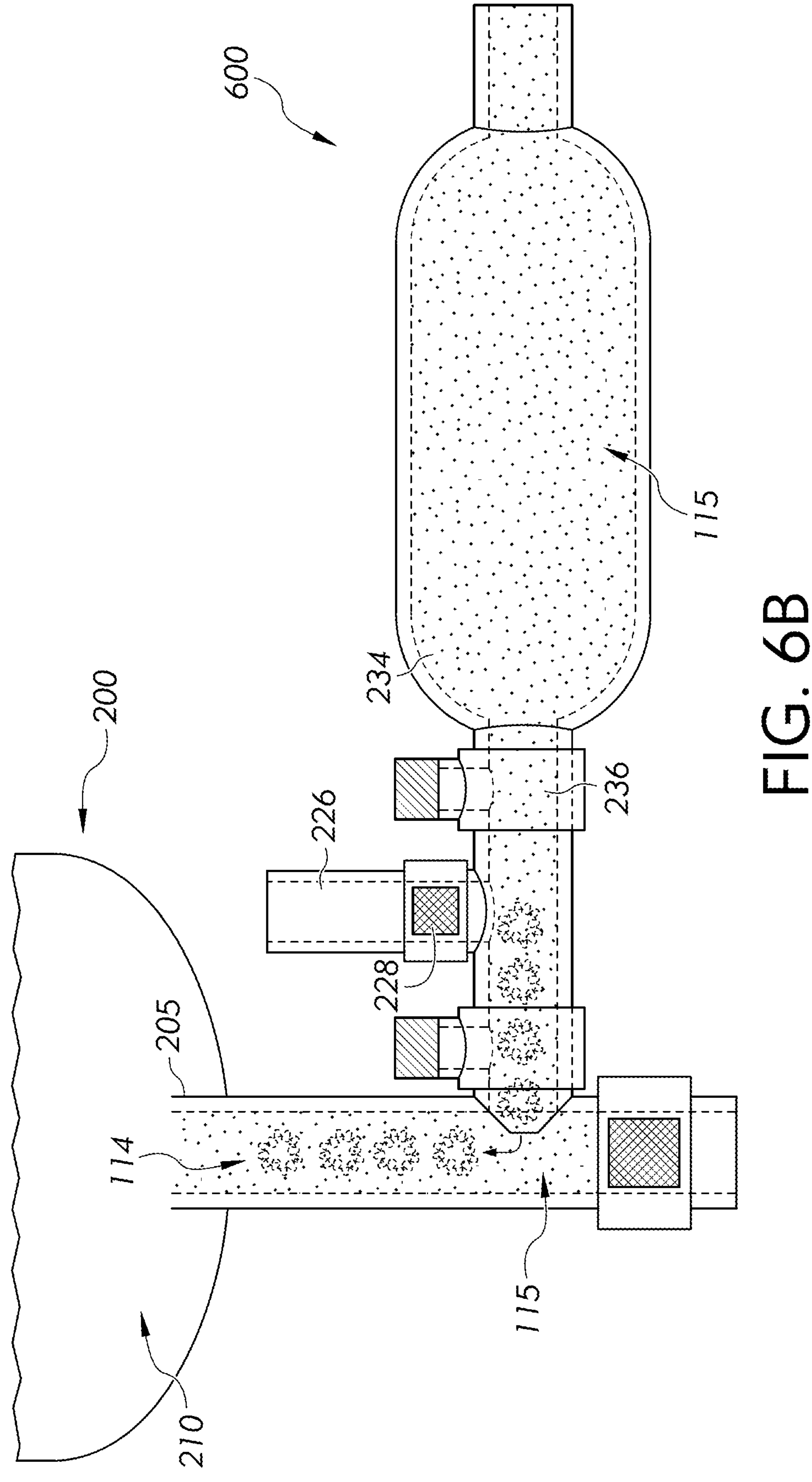
FIG. 6B schematically depicts the injection system of FIG. 6A during introducing a solvent to the internal volume of the metal equipment, according to embodiments shown and described in the present disclosure.

Referring now to FIG. 6A and FIG. 6B, the injection system 600 for injecting the metallic object 114 into the internal volume 210 of the metal equipment 200 is depicted. The injection system 600 may be for injecting the metallic object 114, the solvent 115, or both into the internal volume 210 of the metal equipment 200 through at least one inlet 205. The injection system 600 may include a first channel 226 fluidly coupled to the internal volume 210 and a first valve 228 separating the first channel 226 and the internal volume 210. The metallic object 114 may be introduced to the internal volume 210 through the first channel 226 when the first valve 228 is in an open position. In contrast, when the first valve 228 is in a closed position, the metallic object 114 may be prevented from entering the internal volume 210 of the metal equipment 200. In FIG. 6A, the first valve 228 is in the open position, such that the metallic object 114 is introduced to the internal volume 210 of the metal equipment 200.

Referring again to FIG. 6A and FIG. 6B, the injection system 600 may further include a second channel 234 fluidly coupled to the internal volume 210 and a second valve 236 separating the second channel 234 and the internal volume 210. The solvent 115 may be introduced through the second channel 234 into the internal volume 210 of the metal equipment 200 when the second valve 236 is in an open position. The first valve 228, the second valve 236, or both may be a gate valve, ball valve, or any other suitable valve that would prevent the metallic object 114 or solvent 115 from passing through the first valve 228 and the second valve 236, respectively, in the closed position and would permit the metallic object 114 and the solvent 115 to pass through the first valve 228 and the second valve 236, respectively, in the open position. In FIG. 6B, the first valve 228 and the second valve 236 are in the open position, allowing the metallic object 114 and the solvent 115 to be introduced to the internal volume 210 of the metal equipment 200.

The solvent 115 may be a water solvent, carbon disulfide solvent, or any other suitable solvent. The solvent 115 may function as a carrier of the solid deposits 201 as they are loosened from the interior surface 208 of the side wall 206, as described in further detail below. The solvent 115 may also dissolve the solid deposits 201, or function to further loosen the solid deposits 201 that remain on the interior surface 208 even after the metallic object 114 has impacted the solid deposits 201. In embodiments, translating the magnets 116 in the angular direction may generate a vortex of the solvent 115 to accelerate a rate of solid deposits 201 dissolution in the solvent 115.

Further embodiments of injection systems and/or the use of metallic objects to remove solid deposits can be found in co-pending U.S. patent application Ser. No. 18/344,498, filed on Jun. 29, 2023, and entitled "Systems and Processes for Chemical Processing," the entire contents of which are incorporated by reference in the present disclosure.

Referring again to FIG. 1, the robot 100 may further include a camera 124 coupled to the body 102. The camera 124 may capture image data of the metal surface 202. The image data may detect the metal surface 202. In embodiments, the image data may be used to determine a relative distance or position of the robot 100, drone 400, or both relative to the metal surface 202 of the metal equipment 200. Image data from the camera 124 may act as a guide for the robot 100 or the drone 400. The image data may also detect a curvature of the metal surface 202, such that the magnetic wheels 104 of the robot 100 may be properly placed onto the metal surface 202 of the metal equipment 200.

The robot 100 may also include a location sensor 126. The location sensor 126 may be operable to produce a signal indicative of a location of the robot 100. The location of the robot 100 may correspond to a position on the metal surface 202; the location of the robot 100 may also correspond to a location off of the metal surface 202, such as when the robot 100 has been removed from the metal surface 202 through the propellers 106 or by the drone 400. The location sensor 126 may be a global positioning system (GPS), a geomagnetic field sensor, hall-effect position sensors, or any other suitable location sensor. In embodiments, the location sensor 126 may be a radar or LIDAR sensor capable of determining the position of the robot 100, drone 400, or both relative to other objects, such as the metal equipment 200, other robots 100 or drones 400, or other stationary or mobile equipment. The location sensors 126 may be operated to guide the robot 100, drone 400, or both when moving the robot 100, drone 400, or both relative to the metal equipment 200.

In embodiments, the robot 100 may also include one or more inspection sensors 128. The inspection sensors 128 may detect surface characteristics of the interior surface 208 of the side wall 206, while not being inserted into the internal volume 210 of the metal equipment 200. The inspection sensors 128 may also detect irregularities in the surface characteristics of the interior surface 208, such as the solid deposits 201 on the interior surface 208. The inspection sensors 128 may be coupled to the body 102 or to the distal end 118B of the retractable arm 118.

In embodiments, the inspection sensor 128 may be a gamma scanner. In embodiments, the inspection sensor 128 may include a ray emitter 131 which may emit electromagnetic waves (such as, but not limited to, gamma-rays) into the metal equipment 200. On an opposing side of the metal surface 202, the inspection sensor 128 may also include a ray sensor 132, which may detect the rays emitted from the ray emitter 131. The ray sensor 132 may be coupled to the robot 100 or the ray sensor 132 may be carried by another one of the robots 100 opposite the robot 100 carrying the ray emitter 131.

Based on the detected rays, the inspection sensor 128 may detect the irregularities in the surface characteristics of the interior surface 208. In embodiments, the inspection sensor 128 may be a gamma-ray sensor or an X-ray sensor, or any other suitable sensor for detecting interior surface characteristics of the metal equipment 200. In embodiments, the robot 100 may comprise a single inspection sensor 128 or a plurality of inspection sensors 128. The inspection sensors 128 may include mechanical/physical sensors, electromagnetic sensors, thermal sensors, acoustic/ultrasonic sensors, and/or radiation sensors.

Figure 7:
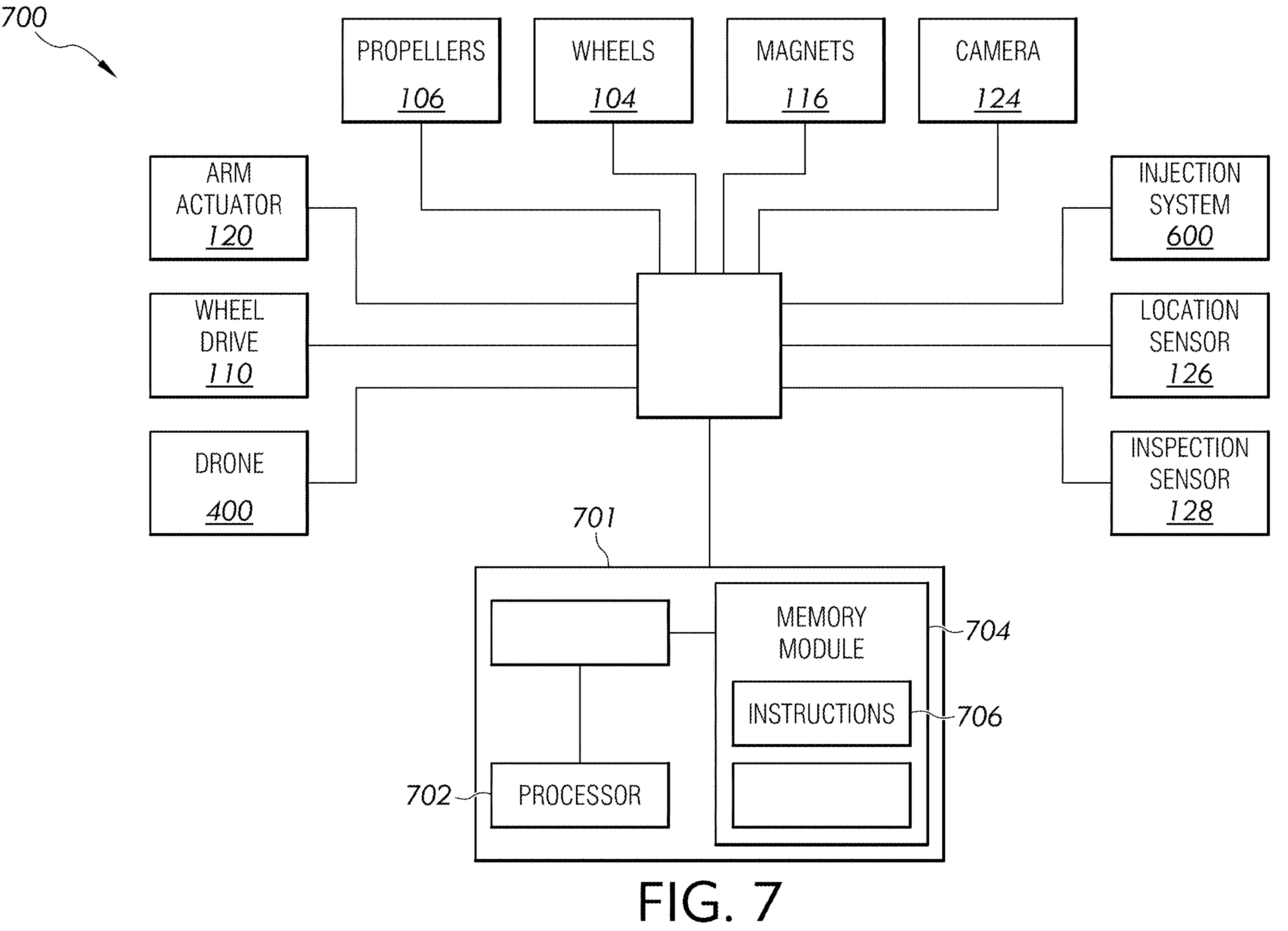
FIG. 7 schematically depicts a distributed computing environment with a control system communicatively coupled to a plurality of components, according to embodiments shown and described in the present disclosure.

Referring now to FIG. 7, a system 700 for traversing the metal surface 202 for use with the robots 100 as discussed above is depicted. The system 700 may include a control system 701 communicatively coupled to the robot 100, drone 400, or both and thus, to a plurality of components connected to the robot 100, the drone 400, or both, as described further below, including the location sensor 126. The control system 701 may include one or a plurality of processors 702, at least one memory module 704 communicatively coupled to the processor 702, and computer readable and executable instructions 706 stored on the at least one memory module 704. The processor 702 can be any device capable of executing machine readable instructions. The machine readable and executable instructions 706, when executed by the processor 702, may cause the system 700 to automatically perform one or more functions described herein.

The propellers 106 of the robot 100 may be communicatively coupled to the control system 701. The machine readable and executable instructions 706, when executed by the processor 702, may cause the system 700 to automatically activate the propellers 106 for at least one of the plurality of robots 100. In embodiments, the system 700 may activate one, two, three, four, or all of the propellers 106 of the robots 100.

The system 700 may map locations of the robots 100 relative to the metal surface 202 with the location sensors 126. Moreover, the system 700 may map the locations of the robots 100 relative to one another. Thus, once the propellers 106 have been activated, the machine readable and executable instructions 706, when executed by the processor 702, may further cause the system 700 to automatically position the robots 100 on the metal surface 202. The system 700 may detach and attach the robots 100 to a variety of different points on the metal surface 202.

Figure 8:
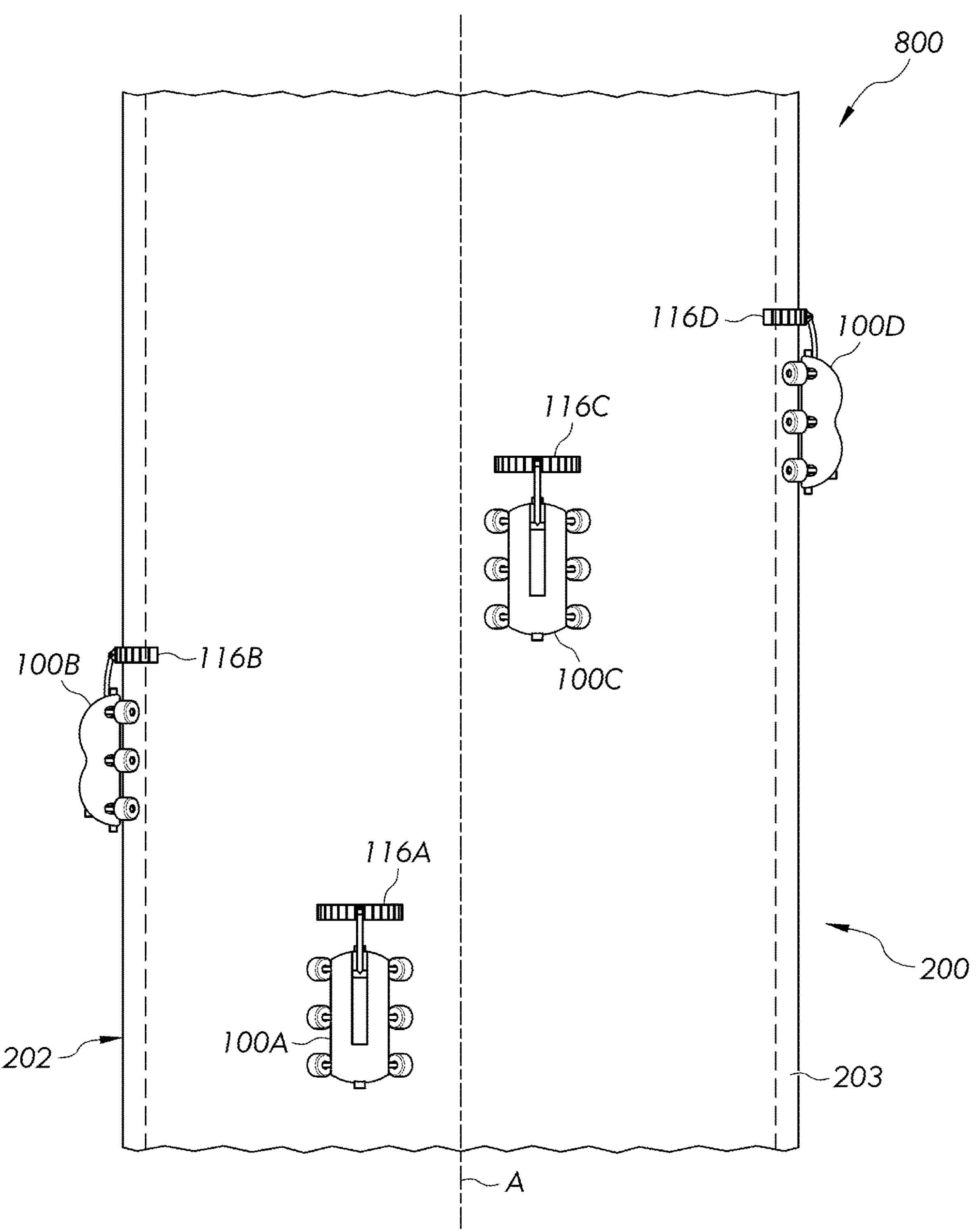
FIG. 8 depicts a hollow structure with a plurality of robots at a first set of points, according to embodiments shown and described in the present disclosure.
Figure 9:
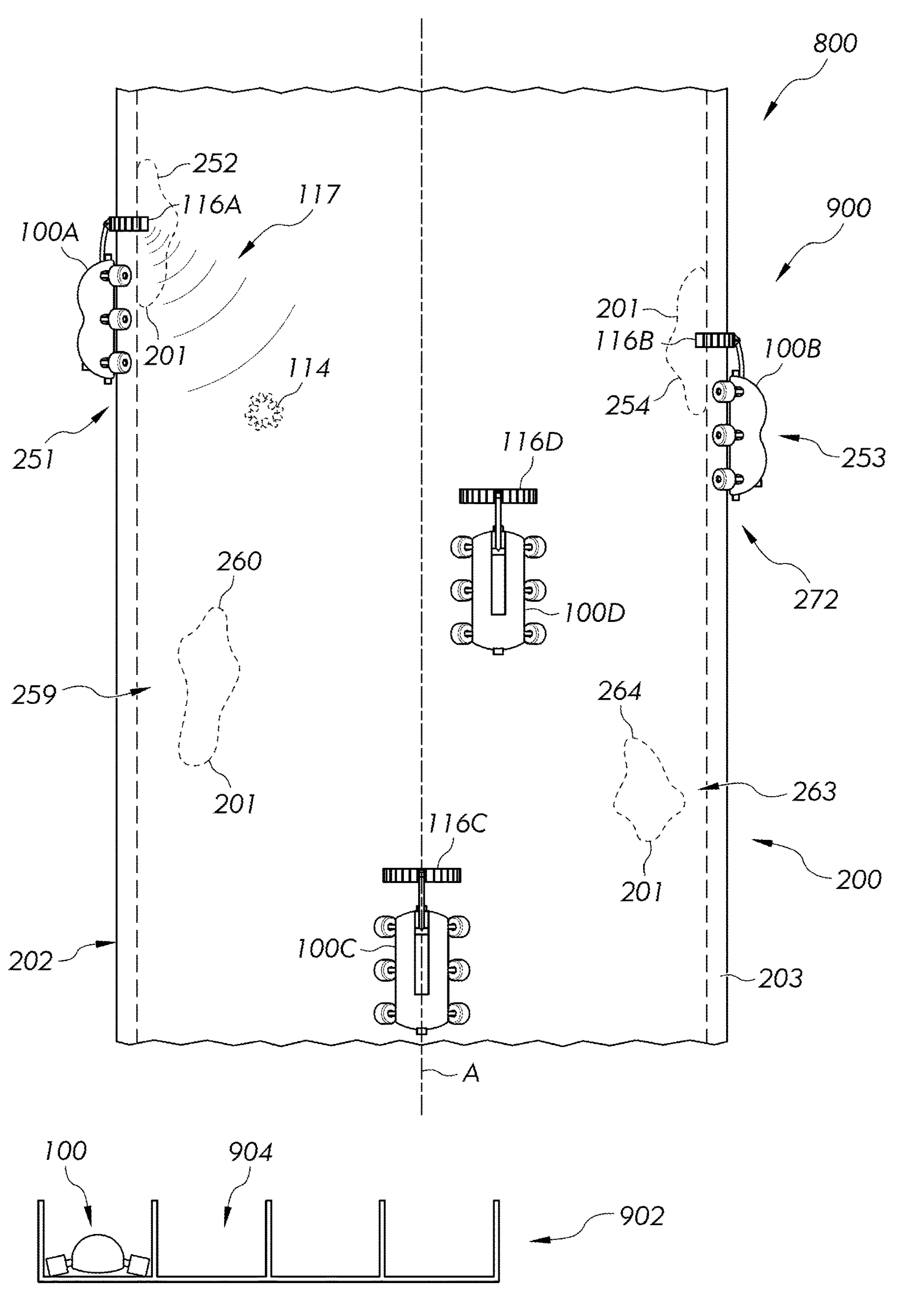
FIG. 9 depicts the hollow structure of FIG. 8 with the plurality of robots positioned at a second set of points, according to embodiments shown and described in the present disclosure.

The machine readable and executable instructions 706, when executed by the processor 702, may cause the system 700 to automatically detach the robots 100 from a first set of points 800, as depicted in FIG. 8. The system 700 may further fly the robots 100 to a second set of points 900 using the propellers 106 and attach the robots 100 to the second set of points 900 on the metal surface 202, as depicted in FIG. 9. The robots 100 may subsequently detach and attach to various points on the metal surface 202. In embodiments, the robots 100 may attach to all points on the metal surface 202. The robots 100 may attach to the metal surface 202 through the magnetic wheels 104.

The magnetic wheels 104 may attach the robots 100 to the metal surface 202. When the magnetic wheels 104 are permanent magnets (as discussed above), the robots 100 may automatically attach to the metal surface 202 when the propellers 106 have guided the robots 100 close enough to the metal surface 202 for the magnetic force of the permanent magnets to attach to the metal surface 202. When the magnetic wheels 104 are electromagnets, the magnetic wheels 104 may be activated/deactivated to attach/detach the robots 100 to the metal surface 202 of the metal equipment 200.

The magnetic wheels 104 and the wheel drives 110 may also be communicatively coupled to the control system 701, such that the machine readable and executable instructions 706, when executed by the processor 702, may cause the system 700 to automatically operate the wheel drive 110 to rotate each of the magnetic wheels 104 to move the robot 100 relative to the metal surface 202 of the metal equipment 200. The robots 100 may travel in the axial direction, the angular direction, or both. The axial direction and the angular direction may be relative to the center axis A of the metal equipment 200 and, thus, relative to a center axis A of a hollow structure 203.

The machine readable and executable instructions 706, when executed by the processor 702, may also cause the system 700 to automatically operate the propellers 106 to generate a lifting force that counteracts the weight of the robot 100, as described hereinabove.

The system 700 may include the hollow structure 203 as the metal equipment 200, where the hollow structure 203 includes the internal volume 210 and the interior surface 208. The metallic object 114 may also be disposed within the hollow structure 203, as discussed above with reference to the metal equipment 200.

The system 700 may also include the drone 400 with the drone body 402 and the drone propellers 405 coupled to the drone body 402. The machine readable and executable instructions 706, when executed by the processor 702, may cause the system 700 to automatically attach the body 102 of the robot 100 to the drone body 402. Once the body 102 of the robot 100 is attached to the drone body 402, the system 700 may detach the robot 100 from the metal surface 202 and reposition the robot 100 on the metal surface 202 (similar to when the robot 100 repositioned via the propellers 106, as discussed above and depicted in FIG. 8 and FIG. 9). The machine readable and executable instructions 706, when executed by the processor 702, may then cause the system 700 to reattach the robot 100 to the metal surface 202 when the body 102 is detached from the drone body 402.

The system 700 may include a first robot 100A and a second robot 100B, as depicted in FIGS. 8-9. The first robot 100A may include the first magnet 116A and the second robot 100B may include the second magnet 116B. The machine readable and executable instructions 706, when executed by the processor 702, may cause the system 700 to automatically reposition the first robot 100A to a first position 251 and activate the first magnet 116A. Referring again to FIG. 9, activating the first magnet 116A may produce the magnetic field 117 that causes the metallic object 114 to impact the interior surface 208 of the metal surface 202 at a first point 252 on the interior surface 208. The machine readable instructions 706, when executed by the processor 702, may further cause the system 700 to reposition the second robot 100B to a second position 253 spaced away from the first position 251. The system 700 may deactivate the first magnet 116A and after or simultaneous with deactivation of the first magnet 116A, activate the second magnet 116B. Activating the second magnet 116B produces the magnetic field 117 that causes the metallic object 114 to travel through the internal volume 210 of the hollow structure 203 and impact the interior surface 208 of the metal surface 202 at a second point 254 spaced apart from the first point 252.

Impacting the metallic object 114 with the interior surface 208 of the metal surface 202 at the first point 252 and the second point 254 loosens solid deposits 201 from the interior surface 208 of the metal surface 202 at the first point 252 and the second point 254, respectively. The impact may loosen or completely break free the solid deposits 201 from the interior surface 208 of the metal surface 202. Once loosened or broken free, the solid deposits 201 may be completely removed from the internal volume 210 when the second valve 236 is opened to introduce the solvent 115 into the hollow structure 203 (discussed further above).

Referring again to FIG. 9, in embodiments, the machine readable instructions 706, when executed by the processor 702, may further cause the system 700 to reposition the first robot 100A to a third position 259 different from the first position 251 and deactivate the second magnet 116B. After deactivating the second magnet 116B, the system 700 may activate the first magnet 116A. Activating the first magnet 116A may produce the magnetic field 117 that causes the metallic object 114 to travel through the internal volume 210 of the hollow structure 203 and impact the interior surface 208 of the metal surface 202 of the hollow structure 203 at a third point 260 on the interior surface 208. After deactivating the second magnet 116B, the system 700 may reposition the second robot 100B at a fourth position 263 different from the second position 253 and deactivate the first magnet 116A. After or simultaneous with deactivating the first magnet 116A, the system 700 may activate the second magnet 116B, where activating the second magnet 116B produces the magnetic field 117 that causes the metallic object 114 to travel through the internal volume 210 of the hollow structure 203 and impact the interior surface 208 of the metal surface 202 at a fourth point 164 spaced apart from the third point 160. Impacting the metallic object 114 with the interior surface 208 of the metal surface 202 at the third point 260 and the fourth point 264 may loosen the solid deposits 201 from the interior surface 208 of the metal surface 202 at the third point 260 and the fourth point 264, respectively.

The machine readable instructions 706, when executed by the processor 702, may further cause the system 700 to automatically repeat the steps of repositioning the first robot 100A, repositioning the second robot 100B, and activating and deactivating each of the first magnet 116A and the second magnet 116B until the metallic object 114 impacts the interior surface 208 of the metal surface 202 at a plurality of points extending all the way around an interior perimeter of the metal surface 202, where the interior perimeter is a shape of the interior surface 208 in the plane perpendicular to the center axis A of the hollow structure 203 or the metal equipment 200. As noted hereinabove, the first robot 100A and the second robot 100B may be repositioned through activation of the wheel drive 110 operatively coupled to each of the magnetic wheels 104. In embodiments, the coupling and releasing of the bodies 102 of the first robot 100A and the second robot 100B by the drone body 402 may reposition the first robot 100A and the second robot 100B. The system 700 may include a single drone 400 or a plurality of drones 400 to reposition the robots 100, such as robots 100A and 100B.

It is noted that the third point 260 and the fourth point 264 are depicted as coaxial with the first point 252 and the second point 254, respectively. However, it should be understood that this is only for illustrative purposes and the first point 252, second point 254, third point 260, and fourth point 264 may be at any location on the interior surface 208. It is noted that the first position 251, second position 253, third position 259, and fourth position 263 of the robots 100 on the metal surface 202 generally correspond to the first point 252, second point 254, third point 260, and fourth 264 on the interior surface 208.

The inspection sensors 128, which are operable to produce the signal indicative of one or more conditions of the metal equipment 200, may be communicatively coupled to the control system 701. The inspection sensor 128 may have any of the features previously described in the present disclosure for the inspection sensor 128. In embodiments, the inspection sensor 128 may be a radar sensor operable to determine a location, thickness, or both of the solid deposits 201 formed on one or more surfaces of the metal equipment 200. The machine readable instructions 706, when executed by the processor 702, may further cause the system 700 to automatically reposition the first robot 100A to the first position 251. The first position 251 may correspond to one or more surfaces of the metal equipment 200 where the solid deposits 201 have been sensed by the robots 100 on the interior surface 208. The system 700 may then activate the first magnet 116A, to produce the magnetic field 117 that may cause the metallic object 114 to impact the interior surface 208 of the metal surface 202 at the first point 252 on the interior surface 208. The system 700 may then reposition the second robot 100B to the second position 253 spaced away from the first position 251. The second position 253 may correspond to one or more surfaces of the metal equipment 200 where the solid deposits 201 have been sensed by the robots 100 on the interior surface 208 of the metal surface 202.

In embodiments, the system 700 may further include machine readable instructions 706, when executed by the processor 702, that may further cause the system 700 to automatically store a history of positions of the solid deposits 201 on the memory module 704. Based on the history of the positions of the solid deposits 201, the system 700 may further generate a predicted location of a buildup of the solid deposits 201 on the interior surface 208 of the metal equipment 200. As such, the system 700 may reposition the robots 100 (such as the first robot 100A and the second robot 100B) to the predicted locations of the buildup of solid deposits 201.

Figure 10:
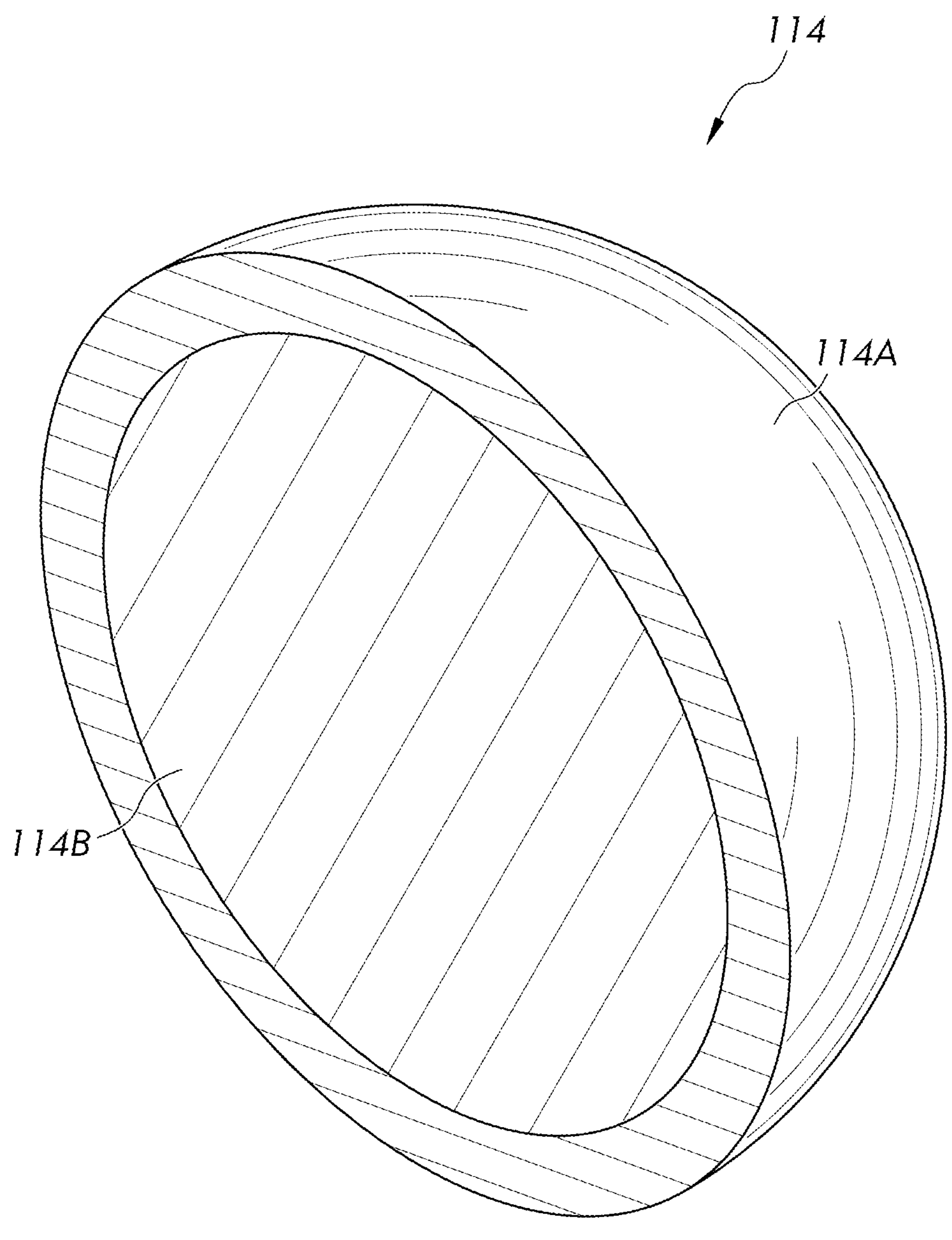
FIG. 10 depicts a metallic object with an inner and outer layer, according to embodiments shown and described in the present disclosure.

As noted hereinabove, the inspection sensor 128 may include ultrasonic sensors. Moreover, referring to FIG. 10, the metallic object 114 may include a high acoustic impedance outer layer 114A and a high ferromagnetic inner layer 114B. As such, the system may determine a thickness of the solid deposits 201 on the interior surface 208 of the metal equipment 200. The ultrasonic sensor 128 may include a transducer that sends ultrasonic waves through the metal surface 202 when the metallic object 114 is attracted to a position in which the solid deposits 201 have accumulated on the interior surface of the metal equipment 200, as discussed hereinabove. The system 700 may include machine readable instructions 706 that, when executed by the processor 702, cause the system 700 to determine a thickness of the solid deposits 201. The system 700 may do so by measuring the time it takes for the ultrasonic waves to return to the ultrasonic sensor 128 when reflected by the high acoustic impedance outer layer 114A of the metallic object 114. For example, ultrasonic waves return to the ultrasonic sensor 128 over a long period of time when the solid deposits 201 are thick. On the other hand, when the solid deposits 201 are thin, it would take the ultrasonic waves less time to return to the ultrasonic sensor 128.

The high acoustic outer layer 114A of the metallic object 114 may include materials such as tungsten, platinum, molybdenum, gold, or any other suitable material. The high ferromagnetic inner layer 114B may be any ferromagnetic material such as iron, cobalt, or nickel.

The system 700 may then deactivate the first magnet 116A and after or simultaneous with deactivating the first magnet 116A, may activate the second magnet 116B. Activating the second magnet 116B may produce the magnetic field 117 that causes the metallic object 114 to travel through the internal volume 210 of the hollow structure 203 and impact the interior surface 208 of the metal surface 202 at the second point 254 spaced apart from the first point 252.

The machine readable instructions 706, when executed by the processor 702, may further cause the system 700 to automatically reposition the first robot 100A to the third position 259 different from the first position 251 after deactivating the first magnet 116A. The third position 259 may correspond to one or more surfaces of the metal equipment 200 where solid deposits 201 have been sensed by the robots 100 on the interior surface 208. The system 700 may further deactivate the second magnet 116B and activate the first magnet 116A after deactivating the second magnet 116B. Activating the first magnet 116A may produce the magnetic field 117 that causes the metallic object 114 to travel through the internal volume 210 of the hollow structure 203 and impact the interior surface 208 of the metal surface 202 of the hollow structure 203 at the third point 260 on the interior surface 208. After deactivating the second magnet 116B, the machine readable instructions 706, when executed by the processor 702, may further cause the system 700 to automatically reposition the second robot 100B at a fourth position 263 different from the second position 253. The fourth position may correspond to one or more surfaces of the metal equipment 200 where solid deposits 201 have been sensed by the robots 100 on the interior surface 208. The system 700 may further deactivate the first magnet 116A and after or simultaneous with deactivating the first magnet 116A, activate the second magnet 116B. Activating the second magnet may produce the magnetic field 117 that causes the metallic object 114 to travel through the internal volume 210 of the hollow structure 203 and impact the interior surface 208 of the metal surface 202 at the fourth point 264 spaced apart from the third point 260.

The machine readable instructions 706, when executed by the processor 702, may further cause the system 700 to automatically repeat the steps of repositioning the first robot 100A, repositioning the second robot 100B, and activating and deactivating each of the first magnet 116A and the second magnet 116B until the metallic object 114 impacts the interior surface 208 of the metal surface 202 at all positions at which the robots 100 have sensed solid deposits 201 through use of the inspection sensors 128.

As noted hereinabove and as depicted in FIG. 1, the robot 100 may include an electrical power source 108, which may include a rechargeable battery 108 recharged through the recharging station 902. In embodiments, the machine readable instructions 706, when executed by the processor 702, may further cause the system 700 to automatically determine when the rechargeable battery 108 is in a low charge condition. When the rechargeable battery 108 is in the low charge condition the machine readable instructions 706, when executed by the processor 702, may further cause the system 700 to automatically detach the magnetic wheels 104 from the metal surface 202, operate the propellers 106 to fly the robot 100 to the recharging station 902, and dock the robot 100 to the recharging station 902 to recharge the rechargeable battery 108. There may be one, two, three, four, or more than four docks 904 at the recharging station 902. In embodiments, there are as many docks 904 at the recharging station 902 as there are robots 100 on the metal equipment 200, such that all of the robots 100 may be recharged at once, if needed.

Referring again to FIGS. 1 and 7, a process for traversing the metal surface 202 using the system 700 of the present disclosure may include activating the propellers 106 for at least one of the robots 100. The robots 100 may include the location sensor 126 and the process may also include positioning the robots 100 on the metal surface 202, as discussed hereinabove. Activating the propellers 106 may generate a lifting force to counteract the weight of the robot 100, as described hereinabove.

The process may further include detaching the robots 100 from the first set of points 800 of the metal surface 202, flying the robots 100 to the second set of points 900 of the metal surface 202, and attaching the robots 100 to the second set of points 900 on the metal surface 202.

The process may also include repositioning the robots 100 on the hollow structure 203, positioning the first robot 100A to the first position 251 and attracting the metallic object 114 to the first point 252 on the interior surface 208 with the first magnet 116A. The process may then include positioning the second robot 100B to the second position 253 and attracting the metallic object 114 to the second point 254 on the interior surface 208 with the second magnet 116B.

Repositioning the first robot 100A and the second robot 100B may include activating the wheel drive 110 that is operatively coupled to each of the magnetic wheels 104. Moreover, repositioning the first robot 100A and the second robot 100B may include coupling and releasing the first robot 100A and the second robot 100B by the drone body 402. The process may also include repositioning the first robot 100A and the second robot 100B to positions that correspond to one or more surfaces of the metal equipment 200 where solid deposits 201 have been sensed by the robots 100 on the interior surface 208 through the use of the inspection sensors 128.

The process may also include determining when the rechargeable battery 108 of the robot 100 is in a low charge condition. When the rechargeable battery 108 is in the low charge condition, the process may include detaching the magnetic wheels 104 from the metal surface 202, operating the propellers 106 to fly the robot 100 to the recharging station 902, and docking the robot 100 to the recharging station 902 to recharge the rechargeable battery 108.

As previously discussed, the system 700 may include the one or more processors 702 and one or more memory modules 704. The one or more processors 702 may include any device capable of executing computer-readable executable instructions stored on a non-transitory computer-readable medium. Accordingly, each processor 702 may include an integrated circuit, a microchip, a computer, and/or any other computing device. The one or more memory modules 704 are communicatively coupled to the one or more processors 702 over a communication path. The one or more memory modules 704 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory modules 704 may be configured to store machine readable and executable instructions 706 for operating one or more components of the system 700.

Embodiments of the present disclosure include logic stored on the one or more memory modules 704 that includes machine-readable and executable instructions or an algorithm written in any programming language of any generation (e.g., 1GL, 2GL, 3GL, 4GL, and/or 5GL) such as, machine language that may be directly executed by the one or more processors 702, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

A first aspect of the present disclosure may be directed to a robot for servicing metal equipment in a hydrocarbon refinery. The robot may include a body, a plurality of magnetic wheels operatively attached to the body, where the plurality of magnetic wheels may be operable to attach the robot to a metal surface of the metal equipment, and a plurality of propellers coupled to the body.

A second aspect of the present disclosure may include the first aspect, where the plurality of magnetic wheels each may include permanent magnets.

A third aspect of the present disclosure may include the either of the first or second aspect, where the plurality of magnetic wheels each may include electromagnets and the robot further may include an electrical power source electrically coupled to each of the plurality of magnetic wheels.

A fourth aspect of the present disclosure may include the third aspect, where the electrical power source may be a rechargeable battery.

A fifth aspect of the present disclosure may include any one of the first through fourth aspects, where the plurality of magnetic wheels may be rotatable relative to the body of the robot.

A sixth aspect of the present disclosure may include any one of the first through fifth aspects, further including a wheel drive operatively coupled to each of the plurality of magnetic wheels, where the wheel drive may be operable to rotate each of the plurality of magnetic wheels relative to the body to move the robot relative to the metal surface of the metal equipment.

A seventh aspect of the present disclosure may include the sixth aspect, where the plurality of magnetic wheels may be operable to pivot relative to the body to move the robot vertically, horizontally, or both with respect to the metal surface.

An eighth aspect of the present disclosure may include any one of the first through seventh aspects, where the plurality of propellers may be operable to reposition the robot on the metal surface of the metal equipment.

A ninth aspect of the present disclosure may include any one of the first through eighth aspects, where the plurality of propellers may be operable to generate a lifting force to counteract a weight of the robot.

A tenth aspect of the present disclosure may include the ninth aspect, where the lifting force equals the weight of the robot.

An eleventh aspect of the present disclosure may include any one of the first through tenth aspects, where each of the plurality of propellers may include a propeller positioner operable to change an orientation of the plurality of propellers relative to the body.

A twelfth aspect of the present disclosure may include the eleventh aspect, where each propeller positioner may be operable to rotate one of the plurality of propellers through 360 degrees relative to the body.

A thirteenth aspect of the present disclosure may include any one of the first through twelfth aspects, where the plurality of propellers may be attached to and rotatable relative to the body.

A fourteenth aspect of the present disclosure may include any one of the first through thirteenth aspects, including a drone body, where the drone body may be coupled to the body of the robot and the plurality of propellers may be coupled to the drone body and the drone body may be releasable from the body of the robot.

A fifteenth aspect of the present disclosure may include any one of the first through fourteenth aspects, further including a magnet coupled to the body, where the magnet may be operable to attract a metallic object to a first position on the metal surface.

A sixteenth aspect of the present disclosure may include the fifteenth aspect, wherein the body of the robot further may include an electrical power source electrically coupled to each of the plurality of magnetic wheels and the magnet.

A seventeenth aspect of the present disclosure may include either of the fifteenth or sixteenth aspect, where the magnet may be an electromagnet.

An eighteenth aspect of the present disclosure may include any one of the fifteenth through seventeenth aspects, where the magnet may extend around at least a portion of the metal surface.

A nineteenth aspect of the present disclosure may include any one of the fifteenth through eighteenth aspects, further including a retractable arm having a proximal end and a distal end, where the proximal end may be coupled to the body and the distal end may be coupled to the magnet.

A twentieth aspect of the present disclosure may include the nineteenth aspect, further including an arm actuator operatively coupled to the retractable arm, wherein the arm actuator may be operable to lower and raise the retractable arm relative to the body to engage or disengage the magnet from the metal surface of the metal equipment.

A twenty-first aspect of the present disclosure may include any one of the fifteenth through twentieth aspects, further including a hollow magnet housing with an inside surface, where the hollow magnet housing may extend around at least a portion of the metal surface and the magnet may be disposed within the hollow magnet housing and may be slidable within the hollow magnet housing.

A twenty-second aspect of the present disclosure may include any one of the fifteenth through twenty-first aspects, further including a plurality of magnets arranged in a curve that at least partially surrounds the metal surface.

A twenty-third aspect of the present disclosure may include any one of the first through twenty-second aspects, further including a camera coupled to the body.

A twenty-fourth aspect of the present disclosure may include any one of the first through twenty-third aspects, further comprising a location sensor, where the location sensor is operable to produce a signal indicative of a location of the robot.

A twenty-fifth aspect of the present disclosure may include any one of the first through twenty-fourth aspects, further comprising one or more inspection sensors operable to produce a signal indicative of one or more conditions of the metal equipment.

A twenty-sixth aspect of the present disclosure may include the twenty-third aspect, where the one or more inspection sensors comprises a radar sensor operable to determine a location, a thickness, or both of solid deposits formed on one or more surfaces of the metal equipment.

A twenty-seventh aspect of the present disclosure may include any one of the first through twenty-sixth aspects, where the body may include a chassis and an outer cover coupled to the chassis, where the plurality of magnetic wheels may be operatively coupled to the chassis.

A twenty-eighth aspect of the present disclosure may include a system for traversing a metal surface of metal equipment. The system may include a plurality of robots according to any one of the first through twenty-seventh aspects. The system may further include at least one location sensor coupled to each of the plurality of robots and a control system communicatively coupled to the robot, where the control system may include a processor, at least one memory module communicatively coupled to the processor, and machine readable and executable instructions stored on the at least one memory module, wherein the machine readable and executable instructions, when executed by the processor, may cause the system to automatically activate the plurality of propellers for at least one of the plurality of robots and position the plurality of robots on the metal surface.

A twenty-ninth aspect may include the twenty-eighth aspect, where the machine readable and executable instructions, when executed by the processor, may further cause the system to automatically detach the plurality of robots from a first set of points of the metal surface, fly the plurality of robots to a second set of points of the metal surface, and attach the plurality of robots to the second set of points on the metal surface.

A thirtieth aspect may include either of the twenty-eighth or twenty-ninth aspects, the plurality of robots further including a wheel drive that may be operatively coupled to each of the plurality of magnetic wheels. The wheel drive may be operable to rotate each of the plurality of magnetic wheels relative to the body to move the robot relative to the metal surface of the metal equipment. The machine readable and executable instructions, when executed by the processor, may further cause the system to automatically operate the wheel drive to rotate each of the plurality of magnetic wheels to move the robot relative to the metal surface of the metal equipment.

A thirty-first aspect may include any one of the twenty-eighth through thirtieth aspects, further including a drone body. The drone body may be coupled to the body of the robot and the plurality of propellers may be coupled to the drone body. The drone body may be releasable from the body of the robot. The machine readable and executable instructions, when executed by the processor, may further cause the system to automatically attach the body of the robot to the drone body, detach the robot from the metal surface, reposition the robot on the metal surface; and reattach the robot to the metal surface.

A thirty-second aspect may include any one of the twenty-eighth through thirty-first aspects, where the machine readable and executable instructions, when executed by the processor, may further cause the system to automatically operate the plurality of propellers to generate a lifting force to counteract a weight of the robot.

A thirty-third aspect may include the thirty-second aspect, where the lifting force may equal the weight of the robot.

A thirty-fourth aspect may include any one of the twenty-eighth through thirty-third aspects, where the system may include a hollow structure including an internal volume and an interior surface and a metallic object may be disposed within the hollow structure.

A thirty-fifth aspect may include the thirty-fourth aspect, where the plurality of robots may travel in an axial direction, an angular direction, or both. The axial direction and the angular direction may be relative to a center axis of the hollow structure.

A thirty-sixth aspect may include either of the thirty-fourth or thirty-fifth aspect, where the plurality of robots may include a first robot and a second robot. The first robot may include a first magnet and the second robot may include a second magnet. The machine readable and executable instructions, when executed by the processor, may cause the system to automatically reposition the first robot to a first position, activate the first magnet, where activating the first magnet may produce a magnetic field that causes the metallic object to impact the interior surface of the metal surface at a first point on the interior surface. The machine readable and executable instructions, when executed by the processor, may further cause the system to automatically reposition the second robot to a second position spaced away from the first position, deactivate the first magnet, and after or simultaneous with deactivating the first magnet, activate the second magnet, where activating the second magnet may produce the magnetic field that causes the metallic object to travel through the internal volume of the hollow structure and impact the interior surface of the metal surface at a second point spaced apart from the first point. Impacting the metallic object with the interior surface of the metal surface at the first point and the second point may loosen solid deposits from the interior surface of the metal surface at the first point and the second point, respectively.

A thirty-seventh aspect may include the thirty-sixth aspect, where the machine readable and executable instructions, when executed by the processor, may further cause the system to automatically store a history of positions of the solid deposits on the at least one memory module, and generate a predicted location of a buildup of solid deposits based on the history of positions of the solid deposits.

A thirty-eighth aspect may include the thirty-seventh aspect, where the machine readable and executable instructions, when executed by the processor, may further cause the system to automatically reposition the first robot and the second robot to the predicted location of the buildup of solid deposits.

A thirty-ninth aspect may include any one of the thirty-sixth through thirty-eighth aspects, where the machine readable and executable instructions, when executed by the processor, may further cause the system to automatically after deactivating the first magnet, reposition the first robot to a third position different from the first position, deactivate the second magnet, and after deactivating the second magnet, activate the first magnet, where activating the first magnet may produce the magnetic field that causes the metallic object to travel through the internal volume of the hollow structure and impact the interior surface of the metal surface of the hollow structure at a third point on the interior surface. The machine readable and executable instructions, when executed by the processor, may further cause the system to automatically after deactivating the second magnet, reposition the second robot at a fourth position different from the second position, deactivate the first magnet, and after or simultaneous with deactivating the first magnet, activate the second magnet, where activating the second magnet may produce the magnetic field that causes the metallic object to travel through the internal volume of the hollow structure and impact the interior surface of the metal surface at a fourth point spaced apart from the third point. Impacting the metallic object with the interior surface of the metal surface at the third point and the fourth point may loosen solid deposits from the interior surface of the metal surface at the third point and the fourth point, respectively.

A fortieth aspect may include the thirty-ninth aspect, where the machine readable and executable instructions, when executed by the processor, may cause the control system to automatically repeat the steps of repositioning the first robot, repositioning the second robot, and activating and deactivating each of the first magnet and the second magnet until the metallic object impacts the interior surface of the metal surface at a plurality of points extending all the way around an interior perimeter of the metal surface. The interior perimeter may be a shape of the interior surface in a plane perpendicular to a center axis of the hollow structure.

A forty-first aspect may include any one of the thirty-sixth through fortieth aspects, where the first robot and the second robot further include a wheel drive operatively coupled to each of the plurality of magnetic wheels, where operation of the wheel drive may reposition the first robot and the second robot.

A forty-second aspect may include any one of the thirty-sixth through forty-first aspects, where the drone body may be coupled to the body of the robot and the plurality of propellers may be coupled to the drone body. The drone body may be releasable from the body of the robot, where coupling and releasing the first robot and the second robot by the drone body may reposition the first robot and the second robot.

A forty-third aspect may include any one of the thirty-sixth through forty-second aspects, further including one or more inspection sensors that may be operable to produce a signal indicative of one or more conditions of the metal equipment.

A forty-fourth aspect may include the forty-third aspect, where the one or more inspection sensors may be ultrasonic sensors. The machine readable and executable instructions, when executed by the processor, may further cause the system to automatically determine a thickness of the solid deposits.

A forty-fifth aspect may include the forty-fourth aspect, where the metallic object may include a high acoustic impedance outer layer and a high ferromagnetic inner layer.

A forty-sixth aspect may include the forty-fifth aspect, where the high acoustic impedance outer layer may be tungsten.

A forty-seventh aspect may include any one of the forty-third through forty-sixth aspects, where the one or more inspection sensors includes a radar sensor that may be operable to determine a location, a thickness, or both of solid deposits formed on one or more surfaces of the metal equipment.

A forty-eighth aspect may include the forty-seventh aspect, the machine readable and executable instructions, when executed by the processor, may cause the system to automatically reposition the first robot to the first position, the first position may correspond to one or more surfaces of the metal equipment where solid deposits have been sensed by the plurality of robots on the interior surface, activate the first magnet, where activating the first magnet may produce a magnetic field that causes the metallic object to impact the interior surface of the metal surface at the first point on the interior surface, and reposition the second robot to the second position spaced away from the first position, the second position may correspond to one or more surfaces of the metal equipment where solid deposits have been sensed by the plurality of robots on the interior surface. The machine readable and executable instructions, when executed by the processor, may further cause the system to automatically deactivate the first magnet, after or simultaneous with deactivating the first magnet, activate the second magnet, where activating the second magnet may produce the magnetic field that causes the metallic object to travel through the internal volume of the hollow structure and impact the interior surface of the metal surface at the second point spaced apart from the first point. Impacting the metallic object with the interior surface of the metal surface at the first point and the second point may loosen solid deposits from the interior surface of the metal surface at the first point and the second point, respectively.

A forty-ninth aspect may include the forty-eighth aspect, where the machine readable and executable instructions, when executed by the processor, may further cause the system to automatically after deactivating the first magnet, reposition the first robot to a third position different from the first position, the third position may correspond to one or more surfaces of the metal equipment where solid deposits have been sensed by the plurality of robots on the interior surface, deactivate the second magnet, and after deactivating the second magnet, activate the first magnet, where activating the first magnet may produce the magnetic field that causes the metallic object to travel through the internal volume of the hollow structure and impact the interior surface of the metal surface of the hollow structure at a third point on the interior surface. The machine readable and executable instructions, when executed by the processor, may further cause the system to automatically after deactivating the second magnet, reposition the second robot at a fourth position different from the second position, the fourth position may correspond to one or more surfaces of the metal equipment where solid deposits have been sensed by the plurality of robots on the interior surface, deactivate the first magnet, and after or simultaneous with deactivating the first magnet, activate the second magnet, where activating the second magnet may produce the magnetic field that causes the metallic object to travel through the internal volume of the hollow structure and impact the interior surface of the metal surface at a fourth point spaced apart from the third point. Impacting the metallic object with the interior surface of the metal surface at the third point and the fourth point may loosen solid deposits from the interior surface of the metal surface at the third point and the fourth point, respectively.

A fiftieth aspect may include the forty-ninth aspect, where the machine readable and executable instructions, when executed by the processor, may cause the control system to automatically repeat the steps of repositioning the first robot, repositioning the second robot, and activating and deactivating each of the first magnet and the second magnet until the metallic object impacts the interior surface of the metal surface at all positions at which the plurality of robots have sensed solid deposits.

A fifty-first aspect may include any one of the twenty-eighth through fiftieth aspects, where the robot further includes a rechargeable battery and a charge sensor operatively coupled to the rechargeable battery.

A fifty-second aspect may include the fifty-first aspect, where the machine readable and executable instructions, when executed by the processor, may further cause the system to automatically determine when the rechargeable battery is in a low charge condition and when the rechargeable battery is in the low charge condition detach the plurality of magnetic wheels from the metal surface, operate the plurality of propellers to fly the robot to a recharging station, and dock the robot to the recharging station to recharge the rechargeable battery.

A fifty third aspect may include a process for traversing a metal surface including activating the plurality of propellers for at least one of a plurality of robots according to any one of the first through twenty-seventh aspects, where at least one location sensor may be coupled to each of the plurality of robots. The process may also include positioning the plurality of robots on the metal surface.

A fifty-fourth aspect may include the fifty-third aspect, where activating the plurality of propellers may generate a lifting force to counteract a weight of the robot.

A fifty-fifth aspect may include the fifty-fourth aspect, where the lifting force may equal the weight of the robot.

A fifty-sixth aspect may include any one of the fifty-third through fifth-fifth aspects, the process further including detaching the plurality of robots from a first set of points of the metal surface, flying the plurality of robots to a second set of points of the metal surface, and attaching the plurality of robots to the second set of points on the metal surface.

A fifty-seventh aspect may include any one of the fifty-third through fifty-sixth aspects, further including repositioning the plurality of robots on a hollow structure, the hollow structure including an internal volume and an interior surface and a metallic object disposed within the hollow structure. The plurality of robots may include a first robot and a second robot, the first robot may include a first magnet, and the second robot may include a second magnet. The process may also include positioning the first robot to a first position, attracting the metallic object to a first point on the interior surface with the first magnet, where attracting the metallic object to the first point on the interior surface may cause the metallic object to impact the interior surface at the first point, and impact of the metallic object with the interior surface at the first point may loosen solid deposits from the interior surface at the first point. The process may also include positioning the second robot to a second position and attracting the metallic object to a second point on the interior surface with the second magnet, where attracting the metallic object to the second point on the interior surface may cause the metallic object to impact the interior surface at the second point. Impact of the metallic object with the interior surface at the second point may loosen solid deposits from the interior surface at the second point.

A fifty-eighth aspect may include the fifty-seventh aspect, where repositioning the first robot and the second robot may include activating a wheel drive, where the wheel drive may be operatively coupled to each of the plurality of magnetic wheels.

A fifty-ninth aspect may include either of the fifty-seventh or fifty-eighth aspects, where repositioning the first robot and the second robot may include coupling and releasing the first robot and the second robot by a drone body of a drone, where the drone body may be coupled to the body of the robot and the plurality of propellers may be coupled to the drone body.

A sixtieth aspect may include any one of the fifty-seventh through fifty-ninth aspects, further including the first robot and the second robot determining a location, a thickness, or both of solid deposits formed on one or more surfaces of the metal equipment, where the first robot and the second robot may include one or more inspection sensors operable to produce a signal indicative of one or more conditions of the metal equipment.

A sixty-first aspect may include the sixtieth aspect, further including repositioning the first robot and the second robot to positions that may correspond to one or more surfaces of the metal equipment where solid deposits have been sensed by the plurality of robots on the interior surface.

A sixty-second aspect may include any one of the fifty-seventh through sixty-first aspects, further including determining when a rechargeable battery of the robot is in a low charge condition and when the rechargeable battery is in the low charge condition detaching the plurality of magnetic wheels from the metal surface, operating the plurality of propellers to fly the robot to a recharging station, and docking the robot to the recharging station to recharge the rechargeable battery.

It may be noted that one or more of the following claims utilize the terms "where," "wherein," or "in which" as transitional phrases. For the purposes of defining the present technology, it may be noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it may be noted that the various details described in this disclosure should not be taken to imply that these details relate to elements that are essential components of the various embodiments described in this disclosure, even in cases where a particular element may be illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

The invention claimed is:

1. A robot for servicing metal equipment in a hydrocarbon refinery, the robot comprising:

a body;

a plurality of magnetic wheels operatively attached to the body, where the plurality of magnetic wheels are operable to attach the robot to a metal surface of the metal equipment;

a plurality of propellers coupled to the body;

one or more inspection sensors coupled to the body, where the one or more inspection sensors are operable to determine a location, a thickness, or both of solid deposits formed on one or more surfaces of the metal equipment; and a magnet coupled to the body, where the magnet is operable to produce a magnetic field that attracts a metallic object toward the magnet to impact the one or more surfaces of the metal equipment to loosen the solid deposits formed on the one or more surfaces of the metal equipment.

2. The robot of claim 1, where the plurality of magnetic wheels each comprise permanent magnets.

3. The robot of claim 1, where the plurality of magnetic wheels each comprise electromagnets and the robot further comprises an electrical power source electrically coupled to each of the plurality of magnetic wheels.

4. The robot of claim 3, where the electrical power source is a rechargeable battery.

5. The robot of claim 1, where the plurality of magnetic wheels are rotatable relative to the body of the robot.

6. The robot of claim 1, further comprising a wheel drive operatively coupled to each of the plurality of magnetic wheels, where the wheel drive is operable to rotate each of the plurality of magnetic wheels relative to the body to move the robot relative to the metal surface of the metal equipment.

7. The robot of claim 6, where the plurality of magnetic wheels are operable to pivot relative to the body to move the robot vertically, horizontally, or both with respect to the metal surface.

8. The robot of claim 1, where the plurality of propellers are operable to reposition the robot on the metal surface of the metal equipment.

9. The robot of claim 1, where the plurality of propellers are operable to generate a lifting force to counteract a weight of the robot.

10. The robot of claim 9, where the lifting force equals the weight of the robot.

11. A system for traversing a metal surface of metal equipment, the system comprising:

a plurality of robots according to claim 1;

at least one location sensor coupled to each of the plurality of robots; and a control system communicatively coupled to the robot, where the control system comprises a processor, at least one memory module communicatively coupled to the processor, and machine readable and executable instructions stored on the at least one memory module, wherein the machine readable and executable instructions, when executed by the processor, cause the system to automatically:

activate the plurality of propellers for at least one of the plurality of robots; and position the plurality of robots on the metal surface.

12. The system of claim 11, where the system comprises a hollow structure comprising an internal volume and an interior surface and the metallic object disposed within the hollow structure, where the plurality of robots travel in an axial direction, an angular direction, or both, where the axial direction and the angular direction are relative to a center axis of the hollow structure.

13. The system of claim 12, where:

the plurality of robots comprise a first robot and a second robot;

the first robot comprises a first magnet;

the second robot comprises a second magnet; and the machine readable and executable instructions, when executed by the processor, cause the system to automatically:

reposition the first robot to a first position;

activate the first magnet, where activating the first magnet produces the magnetic field that causes the metallic object to impact the interior surface of the metal surface at a first point on the interior surface;

reposition the second robot to a second position spaced away from the first position;

deactivate the first magnet;

after or simultaneous with deactivating the first magnet, activate the second magnet, where activating the second magnet produces the magnetic field that causes the metallic object to travel through the internal volume of the hollow structure and impact the interior surface of the metal surface at a second point spaced apart from the first point, where:

impacting the metallic object with the interior surface of the metal surface at the first point and the second point loosens solid deposits from the interior surface of the metal surface at the first point and the second.

14. A system for traversing a metal surface of metal equipment, the system comprising:

a hollow structure comprising an internal volume and an interior surface;

a plurality of robots configured to traverse the metal surface of the metal equipment;

a metallic object disposed within the hollow structure;

one or more inspection sensors operable to determine a location, a thickness, or both of solid deposits formed on the interior surface of the hollow structure;

at least one location sensor coupled to each of the plurality of robots;

a magnet, where the magnet is operable to produce a magnetic field that attracts the metallic object toward the magnet to impact the interior surface of the hollow structure to loosen the solid deposits formed on the interior surface of the hollow structure; and a control system communicatively coupled to the plurality of robots, where the control system comprises a processor, at least one memory module communicatively coupled to the processor, and machine readable and executable instructions stored on the at least one memory module, wherein the machine readable and executable instructions, when executed by the processor, cause the system to automatically:

activate a plurality of propellers for at least one of the plurality of robots;

position the plurality of robots on the metal surface; and activate the one or more inspection sensors.

15. The system of claim 14, where the one or more inspection sensors are ultrasonic sensors, where the machine readable and executable instructions, when executed by the processor, further cause the system to automatically determine a location, a thickness, or both of solid deposits on the interior surface of the hollow structure.

16. The system of claim 15, where the metallic object includes a high acoustic impedance outer layer and a high ferromagnetic inner layer.

17. The system of claim 16, where the high acoustic impedance outer layer is tungsten.

18. The system of claim 14, where the one or more inspection sensors comprises a radar sensor.

19. A process for traversing a metal surface, the process comprising:

activating a plurality of propellers for at least one of a plurality of robots, where at least one location sensor is coupled to each of the plurality of robots;

positioning the plurality of robots on the metal surface;

activating one or more inspection sensors for at least one of the plurality of robots, where the one or more inspection sensors are operable to determine a location, a thickness, or both of solid deposits formed on the metal surface; and activating a magnet for at least one of the plurality of robots, where the magnet is operable to produce a magnetic field that attracts a metallic object toward the magnet to impact the metal surface to loosen the solid deposits formed on the metal surface.

20. The process of claim 19, further comprising:

repositioning the plurality of robots on a hollow structure, the hollow structure comprising an internal volume and an interior surface and the metallic object disposed within the hollow structure where:

the plurality of robots comprise a first robot and a second robot;

the first robot comprises a first magnet; and the second robot comprises a second magnet;

positioning the first robot to a first position;

attracting the metallic object to a first point on the interior surface with the first magnet, where:

attracting the metallic object to the first point on the interior surface causes the metallic object to impact the interior surface at the first point; and impact of the metallic object with the interior surface at the first point loosens solid deposits from the interior surface at the first point;

positioning the second robot to a second position;

attracting the metallic object to a second point on the interior surface with the second magnet, where:

attracting the metallic object to the second point on the interior surface causes the metallic object to impact the interior surface at the second point; and impact of the metallic object with the interior surface at the second point loosens solid deposits from the interior surface at the second point.

* * * * *